United States Patent
Nishimura et al.

(10) Patent No.: US 6,330,796 B1
(45) Date of Patent: Dec. 18, 2001

(54) CONTROL DEVICE FOR DIRECT INJECTION ENGINE

(75) Inventors: Hirofumi Nishimura; Youichi Kuji; Seiko Kono; Hiroyuki Yamashita; Keiji Araki, all of Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/509,606

(22) PCT Filed: Aug. 3, 1998

(86) PCT No.: PCT/JP99/04180

§ 371 Date: Mar. 30, 2000

§ 102(e) Date: Mar. 30, 2000

(87) PCT Pub. No.: WO00/08328

PCT Pub. Date: Feb. 17, 2000

(30) Foreign Application Priority Data

Aug. 3, 1998 (JP) ................................................. 10-232243

(51) Int. Cl.[7] ....................................................... F01N 3/00
(52) U.S. Cl. ................................. 60/286; 60/285; 60/277; 123/295; 123/299; 123/300
(58) Field of Search ............................. 60/284, 285, 286, 60/277, 276; 123/300, 299, 295

(56) References Cited

U.S. PATENT DOCUMENTS

| | | |
|---|---|---|
| 5,482,017 | 1/1996 | Brehob et al. . |
| 5,642,705 | * 7/1997 | Morikawa et al. .................. 123/300 |
| 6,044,642 | * 4/2000 | Nishimura et al. ..................... 60/285 |
| 6,116,208 | * 9/2000 | Nishimura et al. .................... 123/295 |
| 6,141,960 | * 11/2000 | Takami et al. ........................... 60/286 |

FOREIGN PATENT DOCUMENTS

| | | |
|---|---|---|
| 0 710 771 A | 5/1996 | (EP) . |
| 0 719 937 A | 7/1996 | (EP) . |
| 0 826 869 A | 3/1998 | (EP) . |
| 0 856 655 A | 8/1998 | (EP) . |
| 4-187841 | 7/1992 | (JP) . |
| 4-231645 | 8/1992 | (JP) . |
| 07 151001A | 6/1995 | (JP) . |

OTHER PUBLICATIONS

Patent Abstracts of Japan, vol. 1995, No. 09, Oct. 31, 1995 (1995-10-31).

* cited by examiner

Primary Examiner—Thomas Denion
Assistant Examiner—Binh Tran
(74) Attorney, Agent, or Firm—Nixon Peabody LLP; Donald R. Studebaker

(57) ABSTRACT

To reduce the amounts of HC, NOx and other emissions from a direct injection engine when a catalyst is still in its unheated state, and to promote catalyst quick light-off operation by increasing the temperature of exhaust gases, a control device comprises a temperature state identifier (31) for judging the temperature state of a catalyst (22) and a fuel injection controller (33) for controlling fuel injection from an injector (11). The fuel injection controller (33) controls the injector (11) based on judgment results of the temperature state identifier (31) in such a way that the injector (11) makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst (22) is in its unheated state, in which its temperature is lower than its activation temperature, and either of the later injection cycle and earlier injection cycle injects fuel which contributes to main combustion during a main combustion period in which approximately 10% to 90% by mass of the injected fuel is burnt in a combustion process occurring in the combustion chamber.

31 Claims, 12 Drawing Sheets

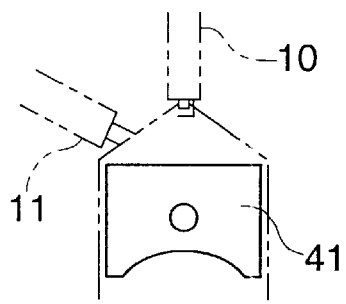
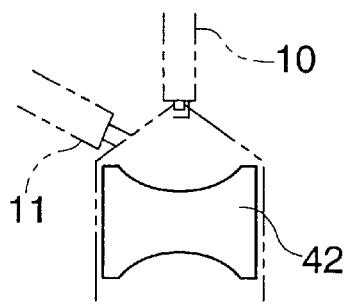
FIG. 6A    FIG. 6B
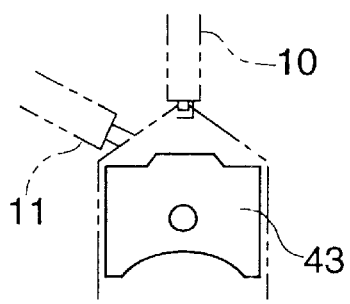
FIG. 6C
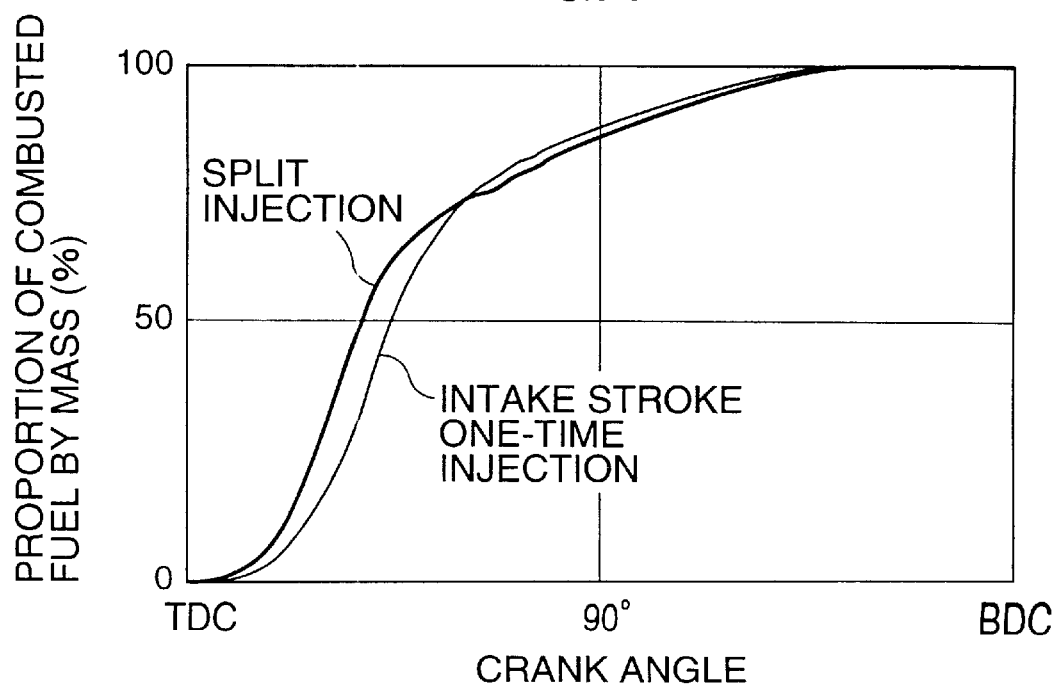
FIG. 7

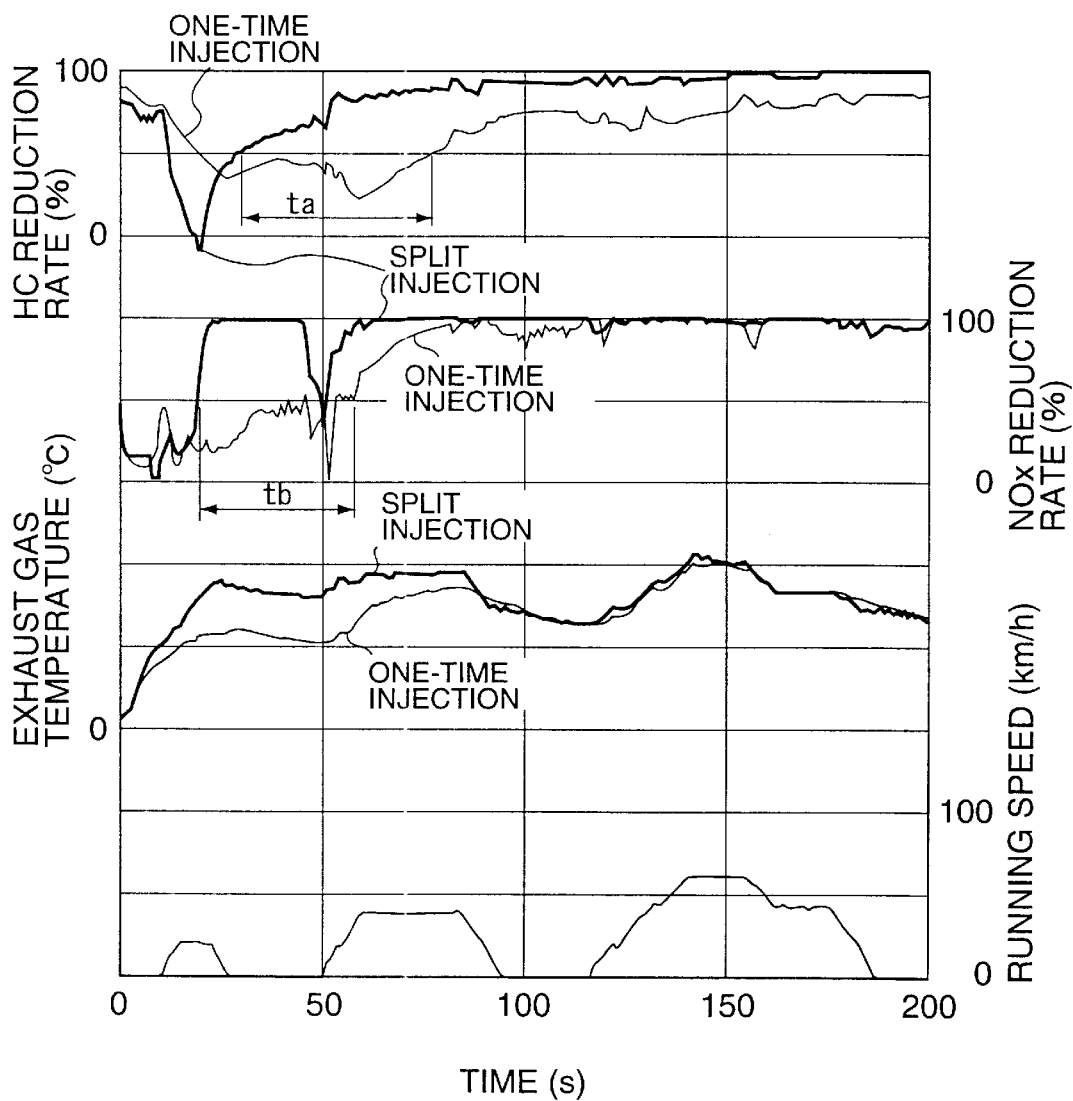

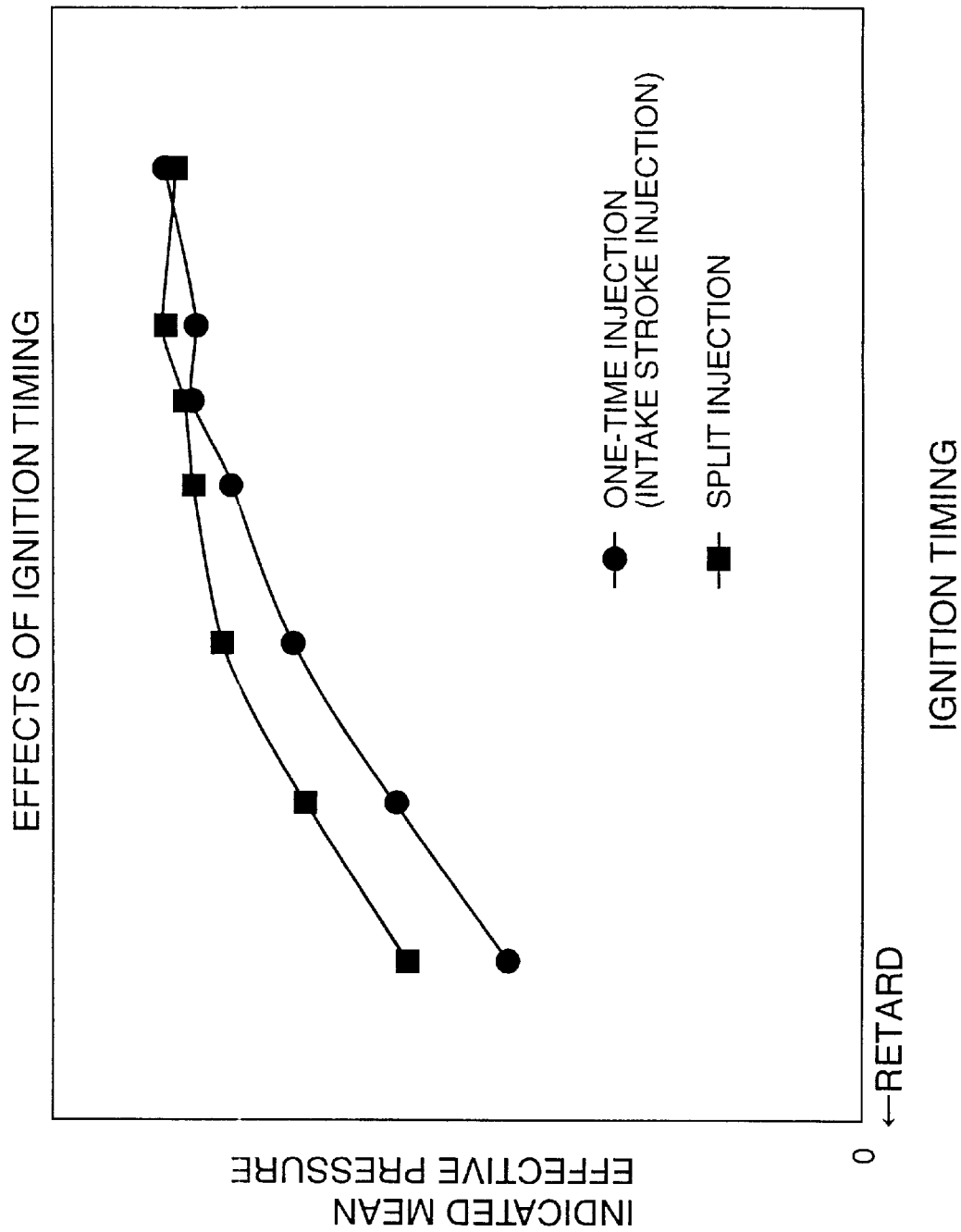

CONTROL DEVICE FOR DIRECT INJECTION ENGINE

TECHNICAL FIELD OF THE INVENTION

This invention relates to a control device for a direct injection engine provided with an injector which injects fuel directly into a combustion chamber.

BACKGROUND ART

A direct injection engine having an injector for injecting fuel directly into a combustion chamber is conventionally known. This engine is operated such that a condition in which a mixture is locally distributed around a spark plug is produced by injecting the fuel in a latter half of a compression stroke to perform so-called stratified charge combustion in a low-load state. This operation makes it possible to increase the air-fuel ratio (leaner mixture) while maintaining combustion stability and improve fuel economy.

Exhaust gases from engines of motor vehicles, for instance, contain hydrocarbons (HC), carbon monoxide (CO) and nitrogen oxides (NOx), and there exists a demand today to reduce generation and release of these harmful constituents as much as possible to achieve improved properties of these emissions. One approach that has conventionally been taken is to provide a catalyst in an exhaust passage, and it is a common practice in the aforementioned direct injection engine as well to provide a catalyst in its exhaust passage. A generally known example of such catalyst is a three-way catalyst which has the ability to clean out HC, CO and NOx approximately at the stoichiometric air-fuel ratio. Another example that has already been developed is a catalyst which can clean out NOx even in a "lean" operating range in order to be suited to lean burn operation by stratified charge combustion in the aforementioned direct injection engine or else.

A fuel injection control device disclosed in Japanese Unexamined Patent Publication No. 4-231645, for example, is known as a device for achieving an improvement in conversion efficiency of a catalyst at low temperatures, for instance, in this type of direct injection engine. In a direct injection engine having a lean NOx catalyst provided in an exhaust passage, the lean NOx catalyst being of a type that requires HC for the reduction of NOx, this device is so arranged as to make primary injection from an injector in a latter part of a compression stroke, and make secondary injection in addition to the aforementioned primary injection to inject a small amount of fuel for supplying HC to the lean NOx catalyst within a period from an intake stroke to an early part of the compression stroke when the temperature of the catalyst is low, or make the aforementioned secondary injection in addition to the aforementioned primary injection within a period from a latter half of a combustion stroke to an early part of an exhaust stroke when the temperature of the catalyst is high. In this device, HC derived from the fuel injected by the secondary injection is supplied to the catalyst in the exhaust passage by setting the amount of fuel injected by the secondary injection to such a small level that will scarcely affect combustion within a combustion chamber, and a low boiling-point constituent of EC is supplied to the catalyst in low-temperature conditions and a high boiling-point constituent of HC is supplied to the catalyst in high-temperature conditions by varying the timing of secondary injection in low-temperature and high-temperature conditions in the aforementioned manner.

A catalyst for exhaust gas conversion can not fully exhibit its conversion effects when the catalyst is not heated yet and the catalyst temperature is lower than its activation temperature. HC and NOx are likely to be released in large quantities in such a case. For this reason, it is required to reduce the amounts of HC and NOx emissions output from the engine to the exhaust passage and to promote catalyst quick light-off operation by increasing the exhaust gas temperature while the catalyst is still in its unheated state, for instance.

The aforementioned direct injection engine, however, has a problem that its catalyst is not easily heated because the amount of heat released into the exhaust passage is small in a case where the air-fuel ratio is increased by performing stratified charge combustion through injection in the compression stroke even when the catalyst is not heated yet.

Although the device disclosed in the aforementioned Publication is intended to achieve an improvement in low-temperature catalyst performance by making, in addition to the primary injection during the latter part of the compression stroke, the secondary injection preceding the primary injection when the temperature of the catalyst is low, the amount of fuel injected by this secondary injection is extremely small and is delivered to the catalyst in the exhaust passage almost without burning within the combustion chamber. Therefore, this device is advantageous only when a lean NOx catalyst of a type that requires HC for the reduction of NOx is used. Moreover, the device makes it possible to achieve NOx conversion effects with the supply of HC only after the catalyst has been activated to a certain degree, though it is still in a low-temperature state, and because HC is released in an earlier unheated state than that point, the device is not favorably suited for achieving an improvement in emissions. Furthermore, the device does not have the function of promoting the catalyst quick light-off operation by an increase in the exhaust gas temperature.

Another measure to deal with cold start of a direct injection engine is, as disclosed in Japanese Unexamined Patent Publication No. 4-187841, such that ignitability is maintained by increasing the amount of fuel injected during the compression stroke while the internal temperature of cylinders is low. More specifically, the engine is controlled to make injection during the compression stroke in a low-load range, split injection during the successive intake and compression strokes in a medium-load range and injection during the intake stroke in a high-load range when the engine is in its warm-running condition, whereas the aforementioned range of split injection is extended to the high-load side while the engine is still cold.

This device, however, maintains the ignitability simply by increasing the amount of fuel injected in the compression stroke by as much as an amount corresponding to deterioration of evaporation and atomization while the engine is cold, and the device does not have the ability to accomplish quick light-off and emission improvement by an increase in the exhaust gas temperature while the catalyst is still in its unheated state.

In the light of the above-described circumstances, it is an object of this invention to provide a direct injection engine capable of reducing the amounts of emissions, such as HC and NOx, from the engine and promoting light-off of a catalyst by increasing the exhaust gas temperature while the catalyst is still in its unheated state, for instance, so that the emissions are significantly achieved through a reduction in the time required until the catalyst is brought to its unheated state and a reduction in the amounts of HC and other emissions when the catalyst is not heated yet.

DISCLOSURE OF THE INVENTION

According to the invention, a control device for a direct injection engine controls the engine in such a way that it makes at least two-step split injection during a period from an intake stroke to an ignition point including a later injection cycle performed in a middle portion of a compression stroke or later and an earlier injection cycle performed prior to the later injection cycle at least in a low-load range of the engine when a catalyst is in its unheated state, in which its temperature is lower than its activation temperature, and that either of the later injection cycle and earlier injection cycle injects fuel which contributes to main combustion during a main combustion period. This control operation ensures ignitability and combustion stability after ignition and produces slow burning in a latter part of a combustion period when the split injection is conducted with the catalyst in its unheated state. It is therefore possible to reduce HC and NOx in exhaust gases released from a combustion chamber when the catalyst is still in its unheated state, resulting in an improvement in emissions, and significantly promote catalyst quick light-off operation as a result of an increase in exhaust gas temperature.

BRIEF DESCRIPTION OF THE DRAWINGS

FIGS. 6(a)–6(c) are diagrams showing variations of pistons for the direct injection engine;

FIG. 7 is a diagram showing variations in the proportion by mass of combusted fuel observed when split injection was conducted and when one-time injection was conducted in an intake stroke;

FIG. 11 is a diagram showing variations with time of HC reduction rate, NOx reduction rate, exhaust gas temperature and vehicle running speed on a vehicle-mounted engine;

FIG. 12 is a diagram showing the relationship between the ignition timing and indicated mean effective pressure when intake stroke one-time injection was made and when split injection was made;

BEST MODE FOR CARRYING OUT THE INVENTION

Figure 1:
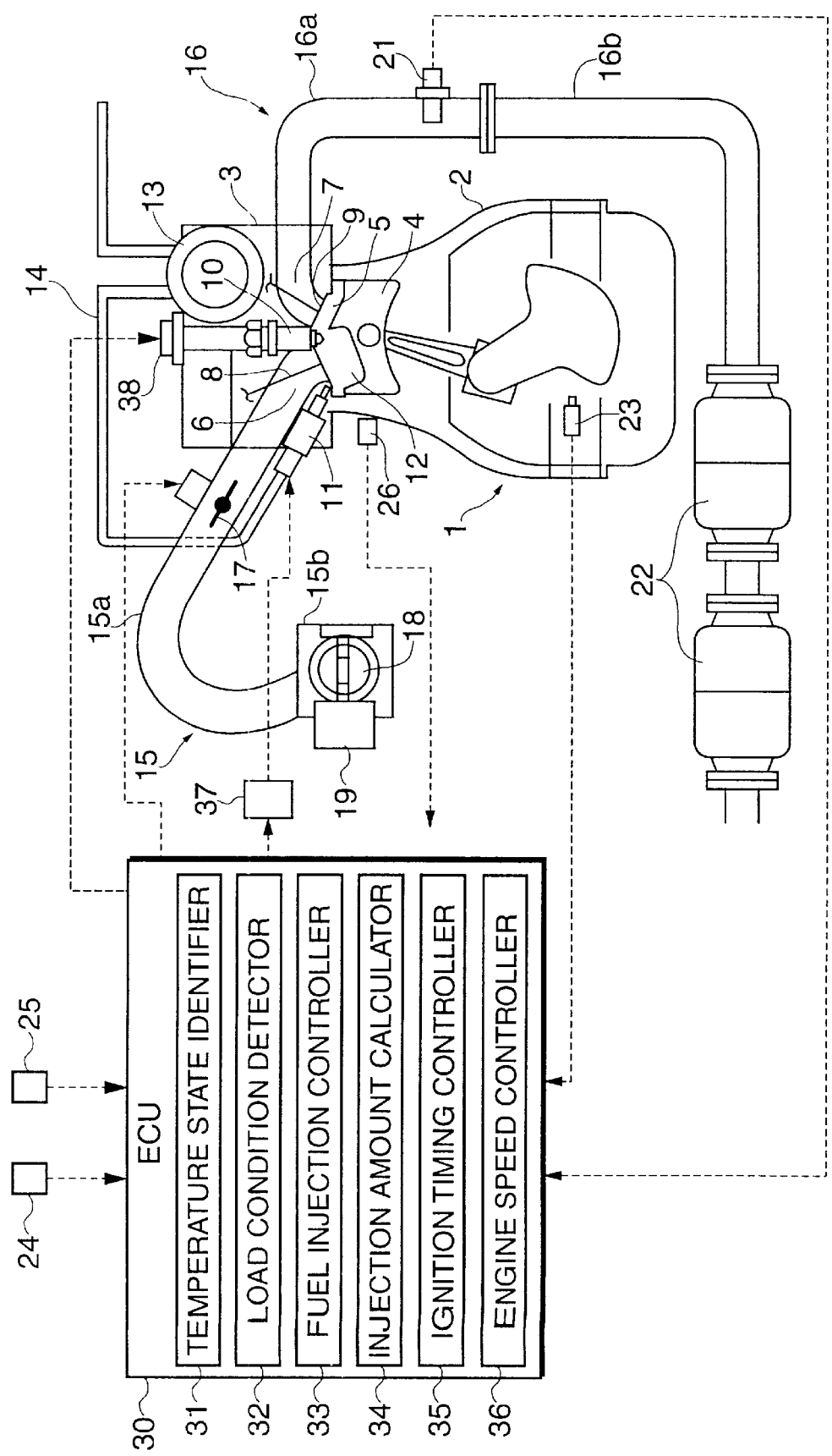
FIG. 1 is a general configuration diagram showing a direct injection engine according to an embodiment of the invention.

FIG. 1 shows a practical example of a direct injection engine. In this Figure, designated by the numeral 1 is a main engine body which includes a cylinder block 2 and a cylinder head 3 in which a plurality of cylinders are formed. A piston 4 is fitted in each cylinder and a combustion chamber 5 is formed between the top surface of the piston 4 and the bottom surface of the cylinder head 3.

Their construction is now explained in a specific manner. A recess having a particular shape is formed in the bottom surface of the cylinder head 3, the recess forming an upper interior surface of the combustion chamber 5. For example, the upper interior surface of the combustion chamber 5 is formed into a pent-roof shape as illustrated, and intake ports 6 and exhaust ports 7 opening into the combustion chamber 5 are formed in its upper interior surface. Although one each intake port 6 and exhaust port 7 are shown in the Figure, two each intake ports 6 and exhaust ports 7, individually arranged in a direction perpendicular to the page of the Figure, are provided in a preferred form. Then, an intake valve 8 and an exhaust valve 9 are provided in each intake port 6 and exhaust port 7, respectively. Driven by an unillustrated valve actuator, the intake valves 8 and the exhaust valves 9 are caused to open and close with specified timing.

Spark plugs 10 are fitted in the cylinder head 3 in such a way that each spark plug 10 is located approximately at the middle of the combustion chamber 5 with its spark gap thrust into the combustion chamber 5.

An injector 11 which injects fuel directly into the combustion chamber 5 is provided at a peripheral part of the combustion chamber 5. In the embodiment shown in FIG. 1, the injector 11 is attached to the cylinder head 3 at the side of the combustion chamber 5 near the intake port 6, and the injector 11 is disposed such that it injects the fuel obliquely downward with the far end of the injector 11 thrust into the combustion chamber 5.

Also in the illustrated embodiment, a cavity 12 having a U-shaped cross section is formed in the top of the piston 4 which constitutes the bottom side of the combustion chamber 5. The location and direction of the injector 11, the location of the cavity 12 and the location of the spark plug 10 is predetermined to satisfy a particular relationship in such a way that the fuel is injected from the aforementioned injector 11 toward the cavity 12 in the latter half of each compression stroke where the piston 4 approaches its top dead center, redirected by the cavity 12 and eventually reaches the vicinity of the spark plug 10.

A high-pressure pump 13 is connected to the aforementioned injector 11 through a fuel-feeding passage 14. The high-pressure pump 13 and a high-pressure regulator which is disposed in an unillustrated return passage jointly adjust fuel pressure exerted on the injector 11 to such a high pressure level that is sufficient to enable fuel injection in a middle portion of the compression stroke or later.

An intake passage 15 and an exhaust passage 16 are connected to the aforementioned main engine body 1. The aforementioned intake passage 15 branches out downstream of a surge tank 15b to the individual cylinders, whereby two branched passages 15a (of which only one is shown in the Figure) running parallel to each other are formed for each cylinder. The two intake ports 6 at the downstream ends of the branched passages 15a open into the combustion chamber 5, and a swirl control valve 17 serving as turbulence enhancing means is provided in one of these branched passages 15a. When the swirl control valve 17 is closed, a swirl is produced in the combustion chamber 5 by intake air inducted through the other branched passage 15a so that the turbulence within the combustion chamber 5 is enhanced.

As an alternative turbulence enhancing means, a valve which produces a tumble may be provided in one branched passage instead of the swirl control valve 17, or there may be made such an arrangement that a squish is produced between the top surface of the piston and the upper interior surface of the combustion chamber (bottom surface of the cylinder head) near the top dead center in the compression stroke.

Further, a throttle valve 18 is provided halfway in the intake passage 15 and this throttle valve 18 is made controllable by an electrically driven actuator 19 like a stepper motor to permit control of the amount of intake air.

An exhaust gas recirculation (EGR) passage (not shown) is connected to the surge tank 15b via an EGR valve (not shown) to make it possible to introduce EGR gas upon completion of engine warm-up.

On the other hand, a carbon dioxide ($O_2$) sensor 21 and a catalytic converter 22 containing catalysts for converting exhaust gases are provided in the exhaust passage 16. The above-mentioned $O_2$ sensor 21 detects the air-fuel ratio of a mixture in the combustion chamber by measuring the concentration of oxygen and is made of a sensor ($\lambda O_2$ sensor) whose output varies at the stoichiometric air-fuel ratio.

While the catalytic converter 22 may be formed of a three-way catalyst, it is desirable to use catalysts capable of reducing NOx contained even in a lean mixture having a higher air-fuel ratio than the stoichiometric air-fuel ratio in order to provide increased conversion efficiency when performing stratified charge combustion of a lean mixture whose air-fuel ratio has been increased after light-off operation, as will be described later. More specifically, while the three-way catalyst exhibits high conversion efficiency against all three pollutants HC, Co and NOx only in the vicinity of the stoichiometric air-fuel ratio as is commonly known, there exists a catalyst (lean NOx catalyst) which not only performs the same function as the three-way catalyst but also reduces NOx even in a lean mixture having a higher air-fuel ratio than the stoichiometric air-fuel ratio. Thus, it is preferable to reduce NOx by using this catalyst under lean operating conditions. It is to be noted, however, that this kind of lean NOx catalyst also exhibits its maximum conversion efficiency in the vicinity of the stoichiometric air-fuel ratio.

Since the catalytic converter 22 contains the lean NOx catalyst, the catalyst temperature is likely to increase excessively under high-speed, high-load conditions if the catalytic converter 22 is provided immediately downstream of an exhaust manifold 16a (or directly connected to it). Therefore, the catalytic converter 22 is connected directly to an exhaust pipe 16b which is connected to the exhaust manifold 16a so that the catalytic converter 22 is situated farther away from the main engine body 1 than the position immediately downstream of the exhaust manifold 16a. In a case where the three-way catalyst is used, however, the catalytic converter 22 may be connected directly to the exhaust manifold because the three-way catalyst has heat-resistant properties.

Designated by the numeral 30 is an ECU (electronic control unit) which performs engine control. Signals from a crank angle sensor 23 which detects the crank angle of the engine, an acceleration sensor 24 which detects accelerator opening (i.e., the amount of operation of an accelerator pedal), an airflow meter 25 which detects the amount of intake air, a water temperature sensor 26 which detects the temperature of engine cooling water, the aforementioned $O_2$ sensor 21, etc. are input to the ECU 30.

The aforementioned ECU 30 includes a temperature state identifier 31, a load condition detector 32, a fuel injection controller 33, a fuel injection amount calculator 34, an ignition timing controller 35 and an engine speed controller 36.

The aforementioned temperature state identifier 31 is for estimating the temperature state of the catalyst and judging whether it is in an unheated state, in which its temperature is lower than its activation temperature, based on a temperature sensing signal fed from the aforementioned water temperature sensor 26. If the water temperature is lower than a first set temperature, the temperature state identifier 31 judges that the catalyst is in its unheated state, and if the water temperature is higher than the first set temperature, the temperature state identifier 31 judges that the catalyst is in its heated state. This temperature state judgment operation for determining catalyst light-off condition may be done by performing water temperature detection and a judgment on elapsed time from the point of engine startup at the same time, or by directly sensing the catalyst temperature.

The aforementioned load condition detector 32 senses the load condition based on a crank angle sensing signal fed from the crank angle sensor 23.

The aforementioned fuel injection controller 33 is for controlling fuel injection timing and the amount of fuel to be injected from the injector 11 through an injector driving circuit 37. When the catalyst is in its unheated state, the fuel injection controller 33 controls the injector 11 to make split injection including at least two injection cycles during a period from an intake stroke to an ignition point at least in a low-load operating range of the engine, the two injection cycles including later injection performed in the middle portion of the compression stroke or later and earlier injection performed prior to the later injection.

Here, the middle portion of the compression stroke refers to an intermediate part of the compression stroke as it is divided in three equal portions, that is, the earlier, middle and later portions. Accordingly, the middle portion of the compression stroke means the period from the point of 120° before the top dead center (BTDC) to the point of 60° BTDC in terms of the crank angle. Thus, the later injection cycle is caused to occur at the point of 120° BTDC or later. It is however desirable to begin the later injection cycle before three-fourths of the period of the compression stroke elapses (not later than 45° BTDC), because combustion stability is impaired if the later injection timing is too late as will be later discussed.

Figure 2:
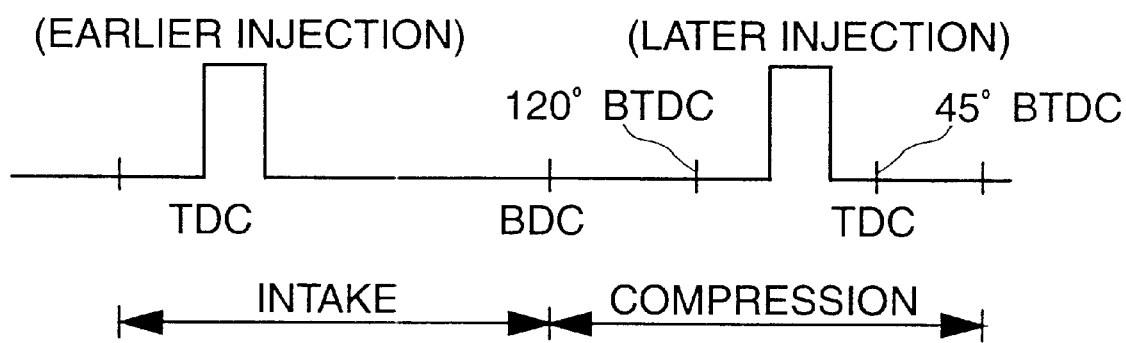
FIG. 2 is a diagram showing injection points of earlier injection and later injection in split injection.

More specifically, the later injection cycle is set to be commenced within a period from 120° ahead of the top dead center to 45° ahead of the top dead center during the compression stroke and the earlier injection cycle is set to be commenced at an appropriate point in time prior to the later injection cycle, e.g., during the period of the intake stroke, as shown in FIG. 2.

In such split injection performed when the catalyst is in its unheated state, the amount of fuel to be injected is calculated by the fuel injection amount calculator 34 such that the air-fuel ratio falls within a set air-fuel ratio range of 13 to 17, and the amount of fuel to be injected is divided with specific proportions by the aforementioned fuel injection controller 33, whereby the amounts of fuel injected by earlier injection and later injection are controlled.

In the above operation, either of the aforementioned earlier injection and later injection cycles is so controlled as to inject fuel which will contribute to main combustion which occurs within a main combustion period. Generally, in a combustion process occurring within a combustion chamber, a period in which up to about 10% of the injected fuel in terms of mass is burnt is called an initial combustion period and a period in which from about 10% to 90% of the injected fuel is burnt is called the main combustion period. As will be explained later again, initial combustion in which fuel injected by later injection is ignited and burnt is a combustion cycle encompassing the initial combustion period and an earlier part of the main combustion period. The amounts of fuel injected in the individual injection cycles are set in such a way that the fuel injected by earlier injection creates a mixture having an air-fuel ratio capable of flame propagation by combustion of the fuel injected by later injection within the combustion chamber so that both proportions of fuel injected by earlier injection and later injection contribute to main combustion, and the lean mixture produced from the fuel injected by earlier injection is slowly burnt.

Specifically, the proportions of the injected fuel are set such that the air-fuel ratio within the combustion chamber obtained by earlier injection only becomes 85 or less to achieve an air-fuel ratio capable of flame propagation from a flame caused by combustion of the fuel injected by later injection and, thus, the proportion of fuel injected by earlier injection is made equal to 1/5 or more (i.e., the proportion of fuel injected by later injection is 4/5 or less) of the total amount of the injected fuel. For example, if the air-fuel ratio within the entire combustion chamber is 17 and the air-fuel ratio within the combustion chamber to be achieved by earlier injection only is 85, the proportion of fuel to be injected by earlier injection is 1/5.

Also, the proportion of fuel injected by later injection is made equal to 1/5 or more (i.e., the proportion of fuel injected by earlier injection is 4/5 or less) of the total amount of the injected fuel. Thus, the proportion of fuel injected by earlier injection falls within a range of 1/5 to 4/5. Preferably, the amount of fuel injected by earlier injection is set such that the air-fuel ratio within the combustion chamber obtained by earlier injection alone becomes equal to or higher than the flammability limit air-fuel ratio (i.e., a limit of air-fuel ratio at which a mixture can be burnt by itself: approximately 30) within the aforementioned range.

It is preferable that the air-fuel ratio within the entire combustion chamber be set, within the aforementioned range of 13 to 17, to a level equal to or slightly higher than the stoichiometric air-fuel ratio. The earlier-mentioned injection amount calculator calculates the amount of fuel to be injected in such a way that the air-fuel ratio within the entire combustion chamber will match the set air-fuel ratio by way of open-loop control or feedback control based on the output from the $O_2$ sensor, as will be described later in greater detail.

Further, the aforementioned ignition timing controller 35 outputs a control signal to an ignition device 38 and thereby controls the ignition timing according to operating conditions of the engine. Although the ignition timing is essentially controlled to achieve a minimum spark advance for best torque (MBT), it is retarded by a specified amount when the catalyst is in its unheated state.

The engine speed controller 36 controls the amount of intake air or the ignition point, for instance, in such a way that the engine idling speed becomes higher when the catalyst is in its unheated state than after the catalyst has been heated.

The aforementioned ECU 30 is so constructed as to control the amount of intake air as well by outputting a control signal to the actuator 19 for driving the throttle valve 18. Specifically, the ECU 30 controls the opening of the throttle valve 18 according to the accelerator opening when the engine is operated at the stoichiometric air-fuel ratio in a high-load range, for instance, when the catalyst is in its unheated state or has already been heated, whereas the ECU 30 controls the throttle valve 18 to open to increase the amount of intake air and thereby increase the air-fuel ratio when stratified charge combustion is made by injecting the fuel solely in the compression stroke in a low-load range, for instance, after light-off. Further, the ECU 30 controls the aforementioned swirl control valve 17 to produce a swirl within the combustion chamber 5 in the case of split injection, for instance.

Figure 3:
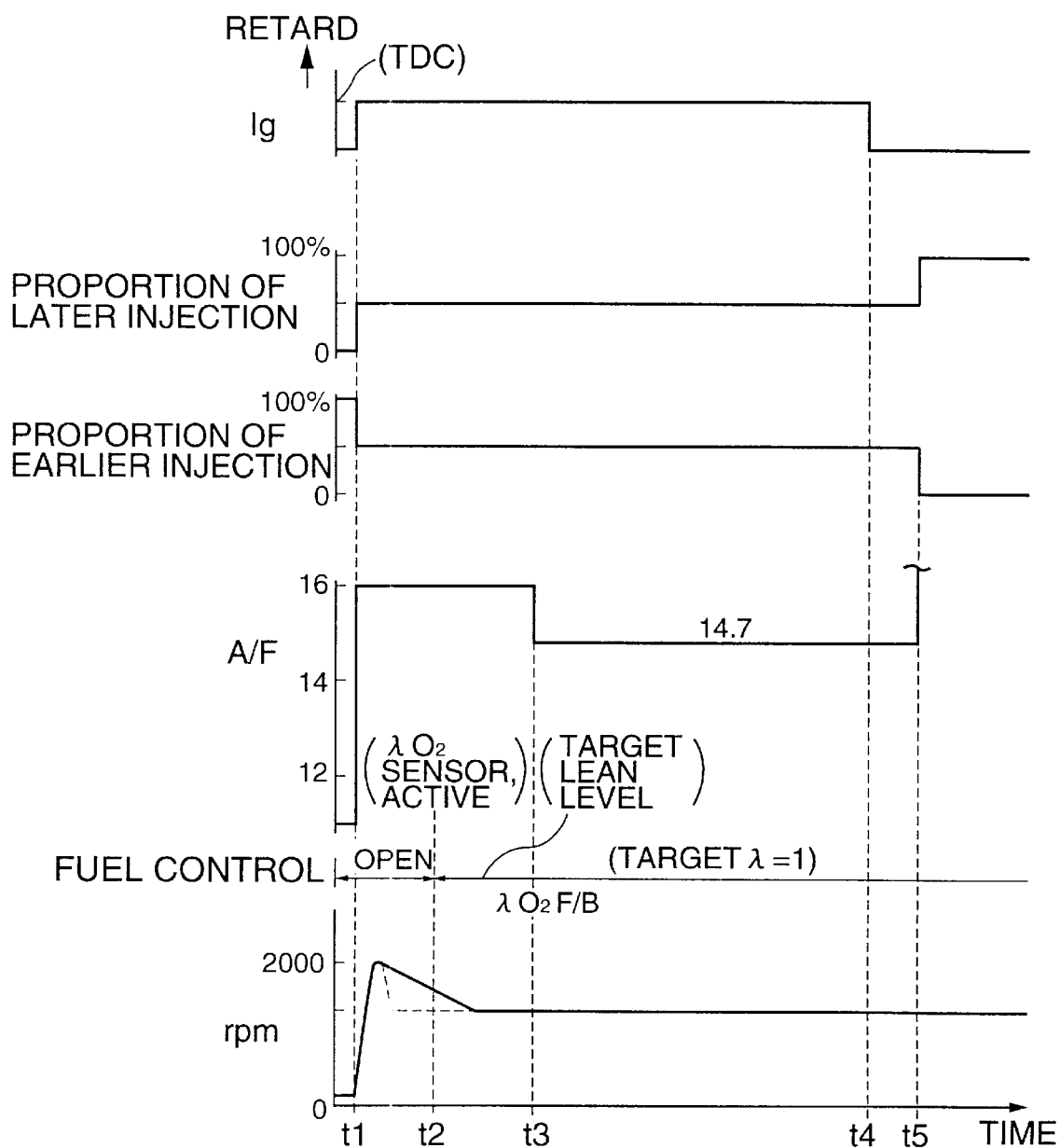
FIG. 3 is a time chart showing an example of control operation.

An example of control operation of this direct injection engine is now described referring to a time chart of FIG. 3.

In FIG. 3, $t_1$ designates the point in time of the end of engine startup operation. Up to the time $t_1$ during the engine startup operation, the air-fuel ratio is held at a lower level (richer mixture) than the stoichiometric air-fuel ratio to maintain startup torque, for instance, and fuel injection from the injector 11 is made in the intake stroke only (intake stroke injection). The reason for this arrangement is that fuel injection in the compression stroke (compression stroke injection), if performed during the engine startup operation, is likely to cause poor evaporation and atomization and eventual misfire due to wetting of the spark plug by the fuel and, therefore, it is desirable to make intake stroke injection to allow for time for fuel evaporation and atomization. In addition, the ignition timing is adjusted to the point of MBT.

Split injection is made when the catalyst remains in its unheated state beyond the engine startup end point $t_1$. More particularly, fuel injection from the injector 11 is made in two separate parts, that is, earlier injection performed during the intake stroke and later injection performed in the middle portion of the compression stroke or later. In the example shown in FIG. 3, equal proportions of fuel are allocated to the earlier injection and later injection cycles.

In this split injection mode, the air-fuel ratio within the entire combustion chamber is set to fall within a range of 13 to 17. In the example shown in FIG. 3, the air-fuel ratio is set to a higher level (leaner mixture) than the stoichiometric air-fuel ratio during a specified time period ($t_1$ to $t_3$) immediately following engine startup, where the catalyst temperature is particularly low within the total period when the catalyst is in its unheated state. While the amount of fuel to be injected is calculated according to the amount of intake air by open-loop control until the $O_2$ sensor 21 is activated, the amount of fuel to be injected is calculated by feedback control based on the output from the $O_2$ sensor 21 from time $t_2$ aiming at a "lean" air-fuel ratio when the catalyst $O_2$ sensor 21 has been activated. Further, from time $t_3$ when a specified time period has elapsed, feedback control based on the output from the $O_2$ sensor 21 is made aiming at the stoichiometric air-fuel ratio ($\lambda$=1).

Furthermore, the ignition timing is retarded while the catalyst is in its unheated state. While the ignition timing is advanced toward the MBT side (or retardation is canceled) and the aforementioned split injection mode is canceled when the catalyst temperature has increased, these switching operations are made with some time lag to alleviate torque shocks. Especially because ignition timing retardation is rather disadvantageous than the aforementioned split injection mode in terms of fuel economy (see later-discussed FIG. 10), the ignition timing is advanced at time $t_4$ when the catalyst temperature has increased to a certain extent and, then, the split injection mode is canceled at time $t_5$ when the catalyst has been heated.

It is to be noted that FIG. 3 shows a practical example of control operation of a stratified charge combustion engine, in which the fuel injection mode and air-fuel ratio are controlled in accordance with operating conditions, wherein if the engine is in a low-speed, low-load range, for instance, it is switched to compression stroke injection to make stratified charge combustion and the air-fuel ratio is increased (leaner mixture). Also, if the engine is in a high-speed range or a high-load range, it is switched to intake stroke injection to produce uniform combustion. Furthermore, in a region between a stratified charge combustion region and a uniform combustion region in a medium-load range, there are cases where split injection is made encompassing the intake and compression strokes as required to prevent a sudden change in torque.

The engine speed is controlled to match an engine idling speed which is set in accordance with engine cooling water temperature, for instance, upon engine startup. Conventionally, the engine speed is quickly reduced to an ordinary engine idling speed corresponding to the engine cooling water temperature immediately after engine startup as shown by broken lines. In this embodiment, however, the engine speed is controlled such that it becomes higher than the ordinary engine idling speed corresponding to the engine cooling water temperature by correcting a target engine speed, for instance, immediately after engine startup when the engine is not heated yet and, then, the engine speed is caused to gradually decrease down to the ordinary engine idling speed. The combustion stability is enhanced and an ignition timing retarding limit is increased as the engine speed is increased immediately after engine startup in the above-described manner.

Of fuel control operations among the control operations shown in the aforementioned time chart, the feedback control performed under lean conditions during a time period $t_2$ to $t_3$ and the feedback control performed at the time $t_3$ or later are explained with reference to FIGS. 4 and 5.

Figure 4:
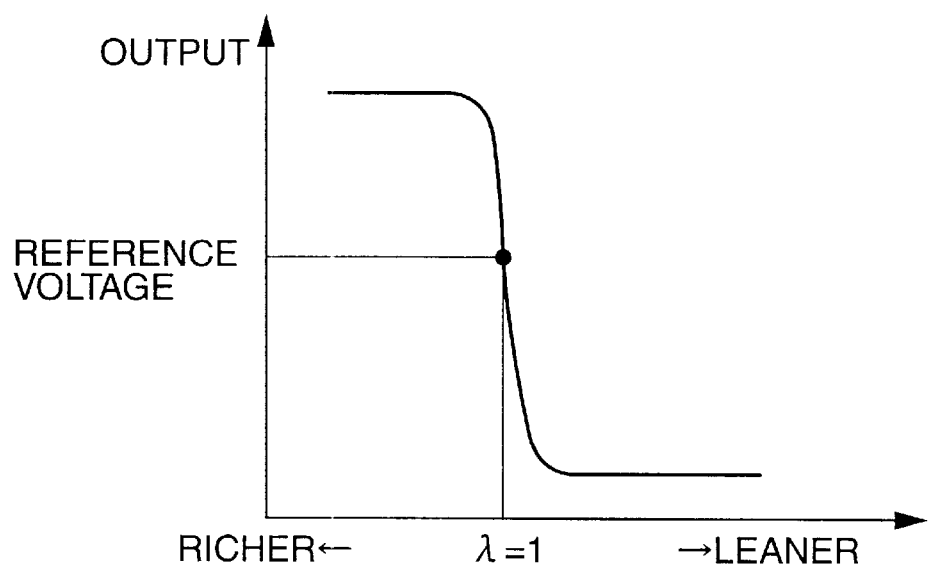
FIG. 4 is a diagram showing an output of an $O_2$ sensor.
Figure 5:
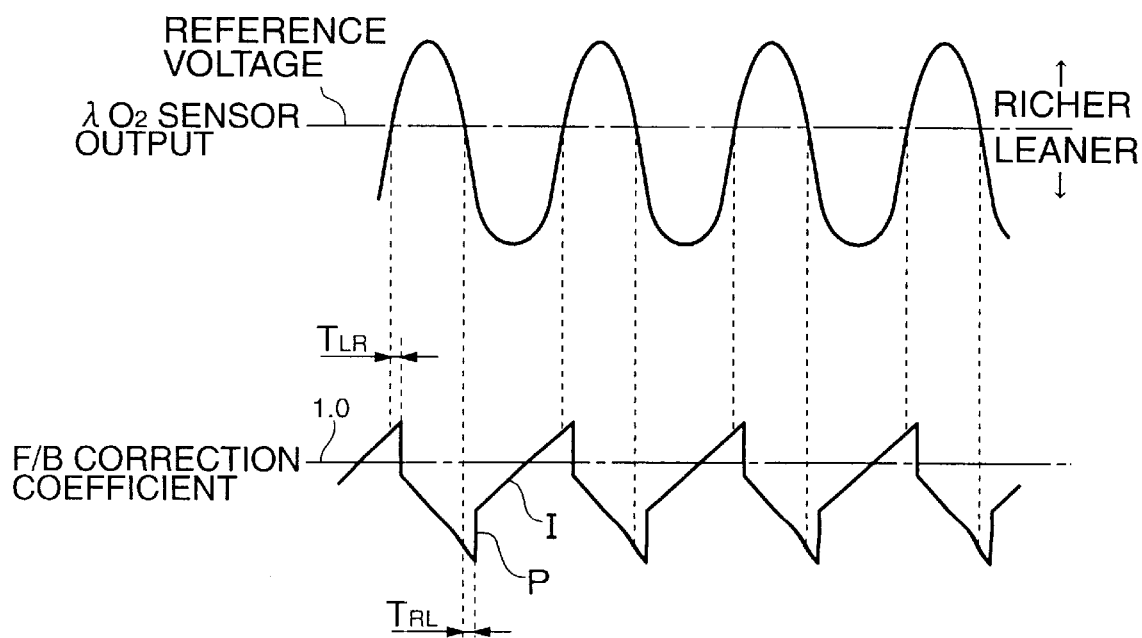
FIG. 5 is a diagram showing variations in the output of the $O_2$ sensor observed when feedback control of the air-fuel ratio is performed and corresponding variations in a feedback correction coefficient.

The output of the aforementioned $O_2$ sensor 21 suddenly changes at the stoichiometric air-fuel ratio ($\lambda=1$) as shown in FIG. 4. Generally in the feedback control based on the output of the $O_2$ sensor 21, a feedback correction coefficient applied to the amount of injected fuel is made variable by a P value which is a constant of proportionality and an I value which is an integration constant as shown in FIG. 5, wherein only one constant, the P value or I value, is varied in a direction of decreasing the amount of injected fuel when the output of the $O_2$ sensor 21 indicates a rich state, whereas only one constant, the P value or I value, is varied in a direction of increasing the amount of injected fuel when the output of the $O_2$ sensor 21 indicates a lean state. In addition, delay times $T_{RL}$ and $T_{LR}$ are set to allow inversion of the feedback correction coefficient when the output of the $O_2$ sensor 21 is inverted from the rich state to the lean state, and from the lean state to the rich state, respectively.

When fuel injection is to be controlled to obtain a specific air-fuel ratio to the "lean" side of the stoichiometric air-fuel ratio during the time period $t_2$ to $t_3$ in the aforementioned feedback control, the delay time $T_{RL}$ is so adjusted that it becomes larger than the delay time $T_{LR}$, causing the average value of the feedback correction coefficient to be shifted to the direction of decreasing the amount of injected fuel. As a consequence, the air-fuel ratio is adjusted in such a way that it is shifted to the "lean" side of the stoichiometric air-fuel ratio. Similar adjustment is possible also by differentiating the aforementioned P or I value depending on whether the output of the $O_2$ sensor 21 indicates the rich state or the lean state.

In the feedback control operation from the time $t_3$, the delay times $T_{RL}$ and $T_{LR}$ are adjusted to the same settings on the "rich" side and the "lean" side to thereby carry out ordinary control operation in which the air-fuel ratio is adjusted to the stoichiometric air-fuel ratio.

The engine depicted in FIG. 1 is constructed such that with the provision of the stratified charge-forming cavity 12 in the top of the piston 4 for capturing the fuel injected from the injector 11 and redirecting it toward the spark plug 10, a stratified charge state in which a relatively rich mixture is locally distributed in the vicinity of the spark plug 10 when fuel injection from the injector 11 is made in the middle portion of the compression stroke or later. The device of this invention, however, is applicable not only to the aforementioned type of engine (hereinafter referred to as the stratified charge engine) but also to a direct injection engine which does not necessarily stratify the mixture (hereinafter referred to as the non-stratified charge engine) with the provision of a piston 41, 42, 43 shown in FIGS. 6(a)–6(c), for example.

In this Description, a "flat piston" refers to a piston which is not provided with the aforementioned cavity 12 for stratified charge formation. Thus, flat pistons are not limited to those having a completely flat top like the one shown in FIG. 6(a) but include those having a recessed or protruding top surface to obtain a combustion chamber shape to meet requirements as shown in FIGS. 6(b)–6(c) as long as such recessed or protruding top shape is not intended for stratified charge formation.

Even when the device of the invention is applied to the aforementioned non-stratified charge engine, control of the later injection in which fuel injection from the injector is made in the middle portion of the compression stroke or later and the earlier injection performed prior to the later injection (during an intake stroke period, for example) may be done as shown in FIG. 3. After the catalyst has been heated, fuel injection may be made during the intake stroke to produce uniform combustion. In this case, although fuel injection may be controlled to produce uniform combustion at $\lambda=1$ in all operating ranges, uniform combustion at a "lean" air-fuel ratio may be made in the low-speed, low-load range.

Operational features of the above-described direct injection engine of the present embodiment are described in the following.

If the catalyst is in its unheated state upon engine startup, fuel injection from the injector is made in two separate parts, that is, earlier injection performed during the intake stroke and later injection performed in the middle portion of the compression stroke or later while controlling the amount of fuel to be injected so as to produce an air-fuel ratio approximately equal to or slightly higher than the stoichiometric air-fuel ratio within the entire combustion chamber at least in the low-load range.

The fuel injected by the earlier injection spreads throughout the entire combustion chamber and creates a mixture layer which is lean but capable of flame propagation, because a sufficient time is available for evaporation, atomization and spreading prior to ignition. The fuel injected by the later injection causes a mixture having a relatively low air-fuel ratio to exist at least in the vicinity of the spark plug 10. Especially in the stratified charge engine shown in FIG. 1, the fuel injected by the later injection is caused to gather at a high concentration around the spark plug and, as a consequence, a stratified charge state in which a mixture layer having an air-fuel ratio equal to or higher than the stoichiometric air-fuel ratio is formed is obtained.

As such fuel supply conditions are created, ignition and combustion of the mixture are made in a desirable fashion, HC and NOx in the exhaust gases released from the engine are reduced, resulting in an improvement in emissions while the catalyst is in its unheated state, and the exhaust gas temperature increases so that catalyst quick light-off operation is promoted. These advantageous effects are specifically explained referring to FIGS. 7 to 14. Split injection referred to in FIGS. 7 to 14 means split injection in which earlier injection is made during the intake stroke and later injection is made during the compression stroke as shown in the foregoing embodiment.

FIG. 7 shows data on variations in the proportion by mass of combusted fuel after ignition examined when split injection was made and when intake stroke one-time injection (comparative example) was made under the following operating conditions:

Engine speed: 1500 rpm

Brake mean effective pressure (Pe): 294 kPa

Ignition timing: Retarded to top dead center (TDC) on compression stroke (in which MBT is about 10° BTDC.)

As shown in this Figure, burning in a latter part of a combustion period is slower in the split injection than in the aforementioned comparative example. This means that the split injection has greater effects in increasing the exhaust gas temperature by afterburning. Since afterburning is sufficiently done in this manner, the catalyst quick light-off operation is promoted and HC is reduced. Furthermore, as will be shown in later-described experimental data, NOx is reduced as well. Reasons why such phenomenon occurs are supposed to be as follows.

When later injection is made in the middle portion of the compression stroke or later, a mixture mass having an air-fuel ratio of λ 1 exists at least locally in the vicinity of the spark plug 10. For example, since a rich mixture layer locally exists around the spark plug 10 in the stratified charge engine shown in FIG. 1, the ignition stability is ensured and combustion after ignition is properly made, so that the burning velocity in initial combustion is increased.

Further, the fuel injected by earlier injection spreads throughout the entire combustion chamber and creates a lean mixture, and as burning of the mixture produced by the earlier-described later injection proceeds, a flame propagates to the lean mixture which was produced by the fuel injected by the earlier injection and mixed with part of the fuel injected by the later injection, whereby the lean mixture mass is burnt. To summarize, burning of the mixture produced by the later injection and succeeding burning of the lean mixture produced mainly by the fuel injected by the earlier injection are made during the main combustion period. Since the burning of the lean mixture is a slow combustion process, it serves to suppress generation of NOx.

It is thus supposed that the catalyst quick light-off operation is promoted with an increase in the exhaust gas temperature and HC is oxidized and reduced.

The aforementioned phenomenon is also accomplished in a non-stratified charge engine employing flat pistons shown in FIG. 6. Specifically, the time period from later injection in the middle portion of the compression stroke or later to ignition is so short that the fuel is not dispersed in a completely uniform fashion, if not stratified, and a condition in which relatively rich mixture masses and lean mixture masses are randomly scattered is created in the non-stratified charge engine as well. Since a locally rich mixture exists near the spark plug, ignition and combustion are made in a desirable fashion, and because the fuel injected by earlier injection forms a uniform and lean mixture, a flame propagates toward it and this mixture is slowly burnt.

Referring again to FIG. 7, the proportion by mass of combusted fuel in an earlier part of combustion rises more quickly in the split injection than in the intake stroke one-time injection, and this indicates that the combustion stability is high. Such phenomenon is conspicuously observed in the non-stratified charge engine employing the flat pistons shown in FIG. 6, as well as in the stratified charge engine shown in FIG. 1 when the amount of fuel injected in the split injection mode is small and the degree of stratification is relatively low, for example. Reasons why such phenomenon occurs are supposed to be as follows.

Since the condition in which relatively rich mixture masses and lean mixture masses are randomly scattered is created by the later injection in the non-stratified charge engine as described above, the flame propagation velocity becomes uneven and irregular recesses and protrusions are formed in a flame front in the process of flame propagation. It is supposed that burning in the earlier part of combustion is promoted because the aforementioned unevenness increases the surface area of the flame and contributes to promotion of combustion.

Also in the stratified charge engine, the time period from the later injection to ignition is so short that the mixture produced by the fuel injected by the later injection is locally distributed around the spark plug, and because there is unevenness in the distribution of the air-fuel ratio even within the locally distributed region, there exist relatively rich mixture masses and relatively lean mixture masses around the spark plug when the degree of stratification is relatively low. It is supposed that the surface area of the flame burning in the earlier part of combustion is promoted because the flame propagation velocity becomes uneven and this increases the surface area of the flame.

As it becomes possible to increase the amount of ignition timing retardation when the combustion stability is enhanced as described above, it is possible to further increase the exhaust gas temperature by retardation of the ignition timing and thereby enhance the effects of quick light-off and reduction of HC and other emissions in addition to the earlier-mentioned effects of increasing the exhaust gas temperature by afterburning.

Figure 8:
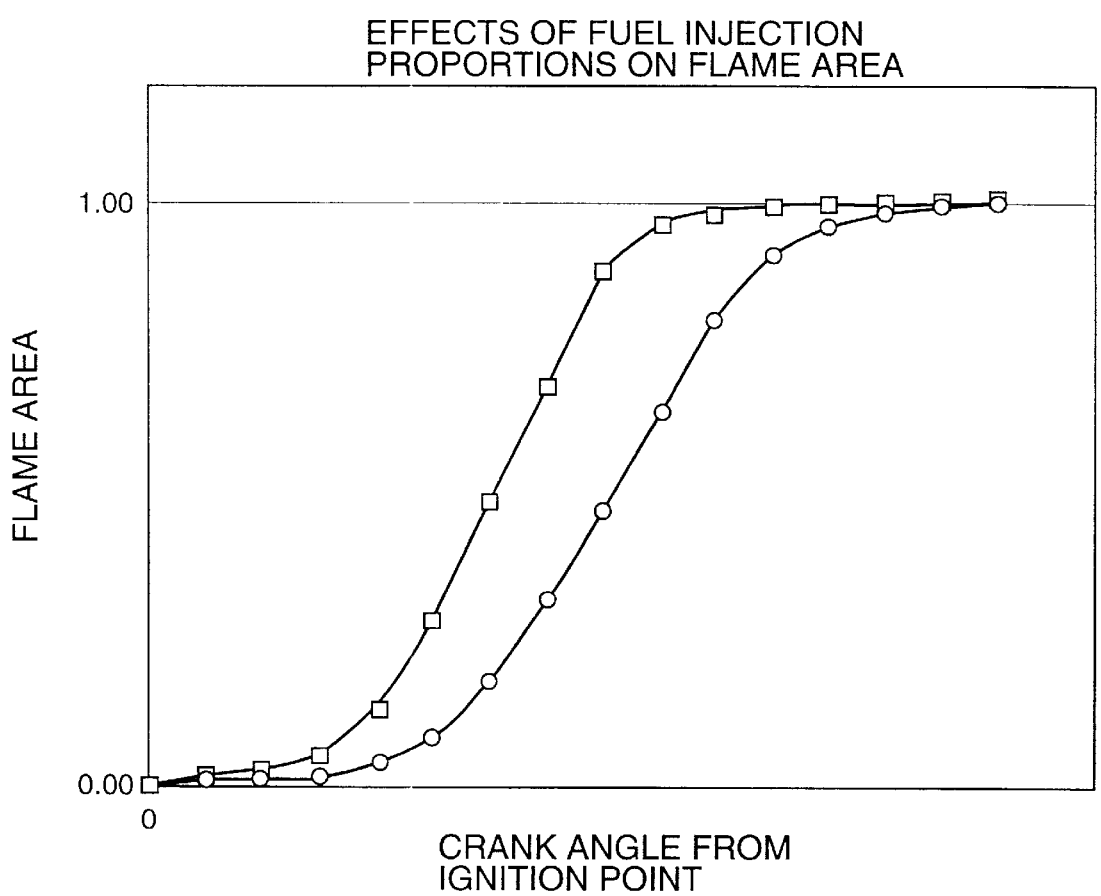
FIG. 8 is a diagram showing variations in flame front area observed when split injection and one-time injection were conducted.

FIG. 8 shows data on variations in the surface area of a flame (or flame front area) in relation to the crank angle from the ignition point observed when intake stroke one-time injection and split injection were made to examine the effects of split injection on the flame front area. As can be seen from this Figure, the flame front area increases rapidly and the combustion stability is enhanced by split injection compared to one-time injection.

Figure 9:
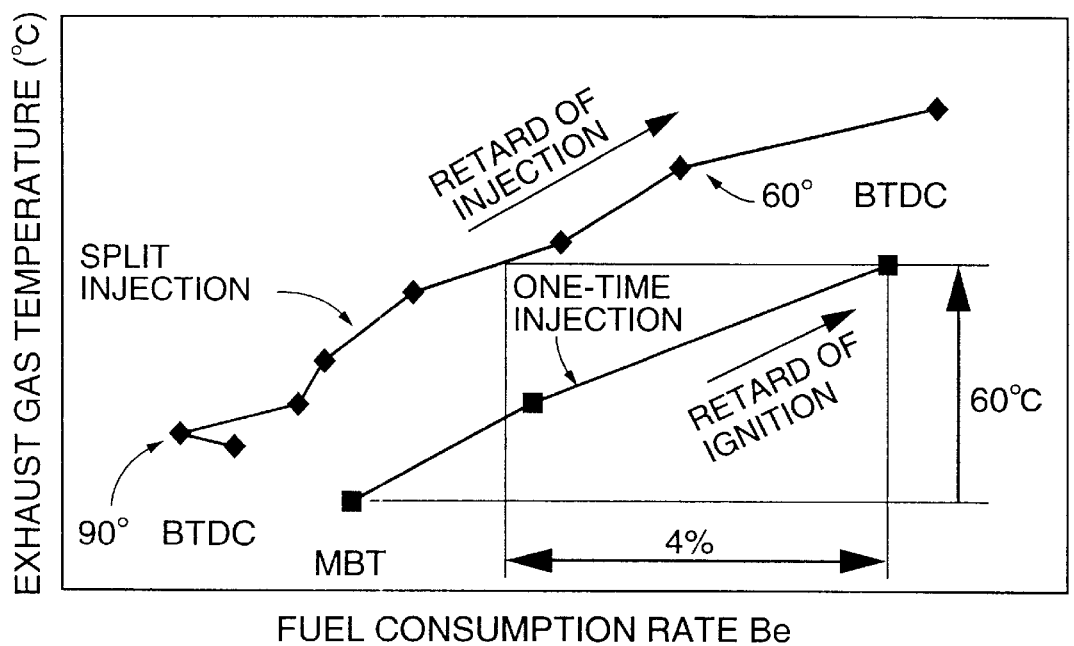
FIG. 9 is a diagram showing exhaust gas temperature and fuel economy rate observed when later injection timing is altered in various ways while performing split injection and when the amount of ignition timing retardation is altered in various ways while performing one-time injection.
Figure 10A:
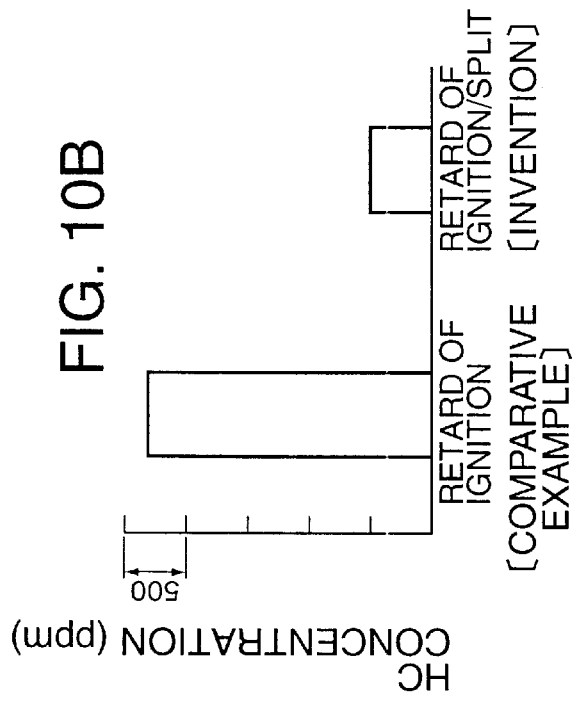
FIG. 10 presents graphs showing (a) exhaust gas temperature, (b) HC concentration, (c) NOx concentration and (d) engine speed fluctuation coefficient obtained when split injection and one-time injection were conducted.
Figure 10B:
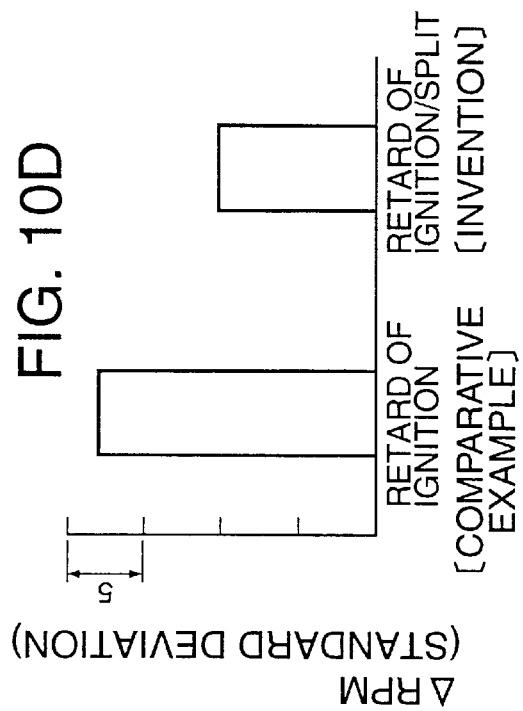
Figure 10C:
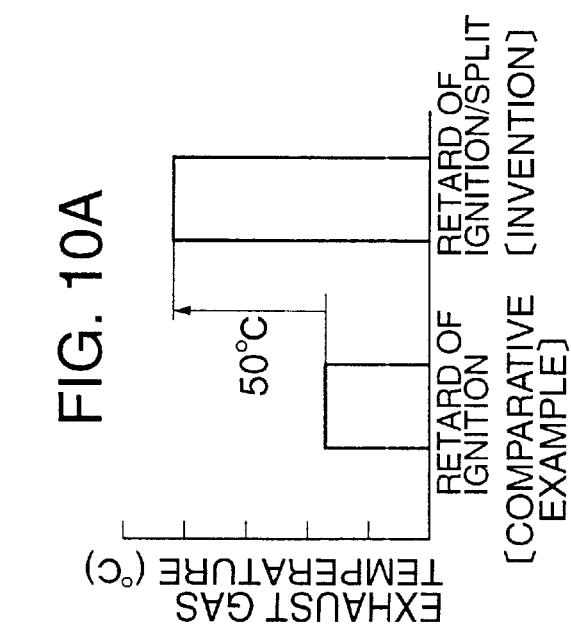
Figure 10D:
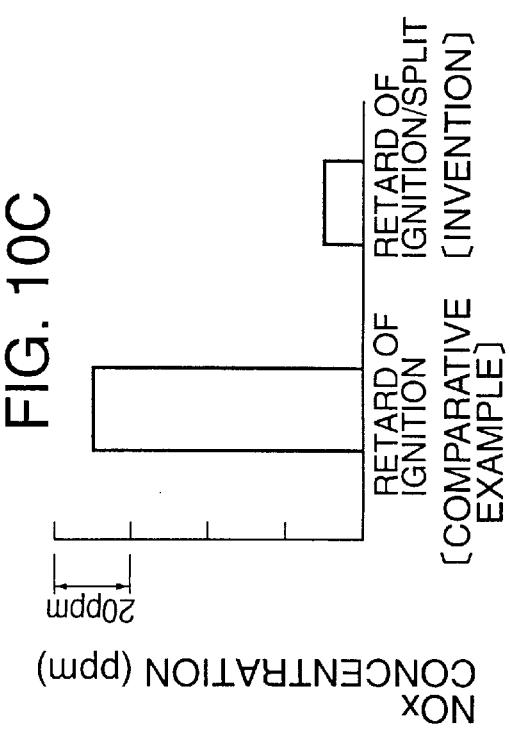

FIG. 9 shows variations in fuel economy rate and exhaust gas temperature observed when the later injection timing is altered with the ignition timing varied from the point of MBT to a retarding side in intake stroke one-time injection and with the ignition timing set to the point of MBT in split injection. Operating conditions used were an engine speed of 1500 rpm and a brake mean effective pressure (Pe) of 294 kPa. As can be seen from this Figure, the exhaust gas temperature increases and the fuel economy rate deteriorates as the injection timing is progressively retarded in the case of intake stroke one-time injection. On the other hand, the exhaust gas temperature increases and the fuel economy rate deteriorates as the later injection timing is progressively retarded from about 90° BTDC (before the top dead center) on the compression stroke in the case of split injection.

A comparison of these cases indicates that the fuel economy rate is decreased in split injection when the exhaust gas temperature is the same. (The exhaust gas temperature increases by 60° C. when the injection timing is retarded from the point of MBT in intake stroke one-time injection, for example.) To summarize, the exhaust gas temperature can be more increased by retarding the ignition timing in split injection than in one-time injection provided that the deterioration in fuel economy is kept approximately to the same level. Furthermore, it will be possible to increase the exhaust gas temperature to an even greater extent if the ignition timing is retarded while performing the split injection.

FIG. 10 shows measurement results of exhaust gas temperature, HC and NOx concentrations in exhaust gases released from the combustion chamber and engine speed fluctuation coefficient ΔRPM (standard deviation) taken from a testing of a comparative example in which the ignition timing was retarded in intake stroke one-time injection and of the practical example of the invention in which the ignition timing was retarded in split injection, the testing being conducted with the amount of ignition timing retardation adjusted to equalize the amount of fuel consumption for the two examples (the ignition timing was retarded up to TDC in both the comparative example and the practical example) at an engine speed of 1500 rpm under low-load operating conditions. As can be seen from this Figure, the exhaust gas temperature is significantly more increased, the HC and NOx concentrations are more reduced and the engine speed fluctuation coefficient ΔRPM is more reduced in the practical example of this invention than in the comparative example even under the same operating conditions and at the same amount of fuel consumption.

Reasons for this are supposed to be that the exhaust gas temperature is increased and HC is reduced since burning in the latter part of combustion is slowed down by split injection as described earlier, NOx is reduced because burning of a lean mixture produced by earlier injection becomes a slow combustion process, for instance, the combustion stability is enhanced due to promotion of burning in the earlier part of the combustion period, and so forth.

FIG. 11 shows measurement results of HC reduction rate, NOx reduction rate and exhaust gas temperature taken when one-time injection was conducted in the intake stroke and when split injection was conducted while driving a motor vehicle equipped with the direct injection engine. As can be seen from this Figure, the increase in the exhaust gas temperature is accelerated in the case of split injection compared to the case of intake stroke one-time injection and, as a consequence, periods of time individually required for the HC reduction rate and NOx reduction rate reach 50% are significantly reduced (by ta and tb as illustrated, respectively).

FIG. 12 shows data on the relationship between the ignition timing and indicated mean effective pressure examined when intake stroke one-time injection was made and when split injection was made. As can be seen from this Figure, although the indicated mean effective pressure (torque) decreased when the ignition timing is retarded, the degree of reduction in the indicated mean effective pressure is smaller in split injection than in intake stroke one-time injection.

It is recognized from the aforementioned data that HC and NOx in the exhaust gases released from the engine are reduced, resulting in an improvement in emissions, and the catalyst light-off operation is promoted as a result of an increase in the exhaust gas temperature by making split injection when the catalyst is in its unheated state as in the present invention. Moreover, the combustion stability and fuel economy are improved in this invention compared to the case in which the ignition timing is retarded by a large amount in one-time injection.

Figure 13:
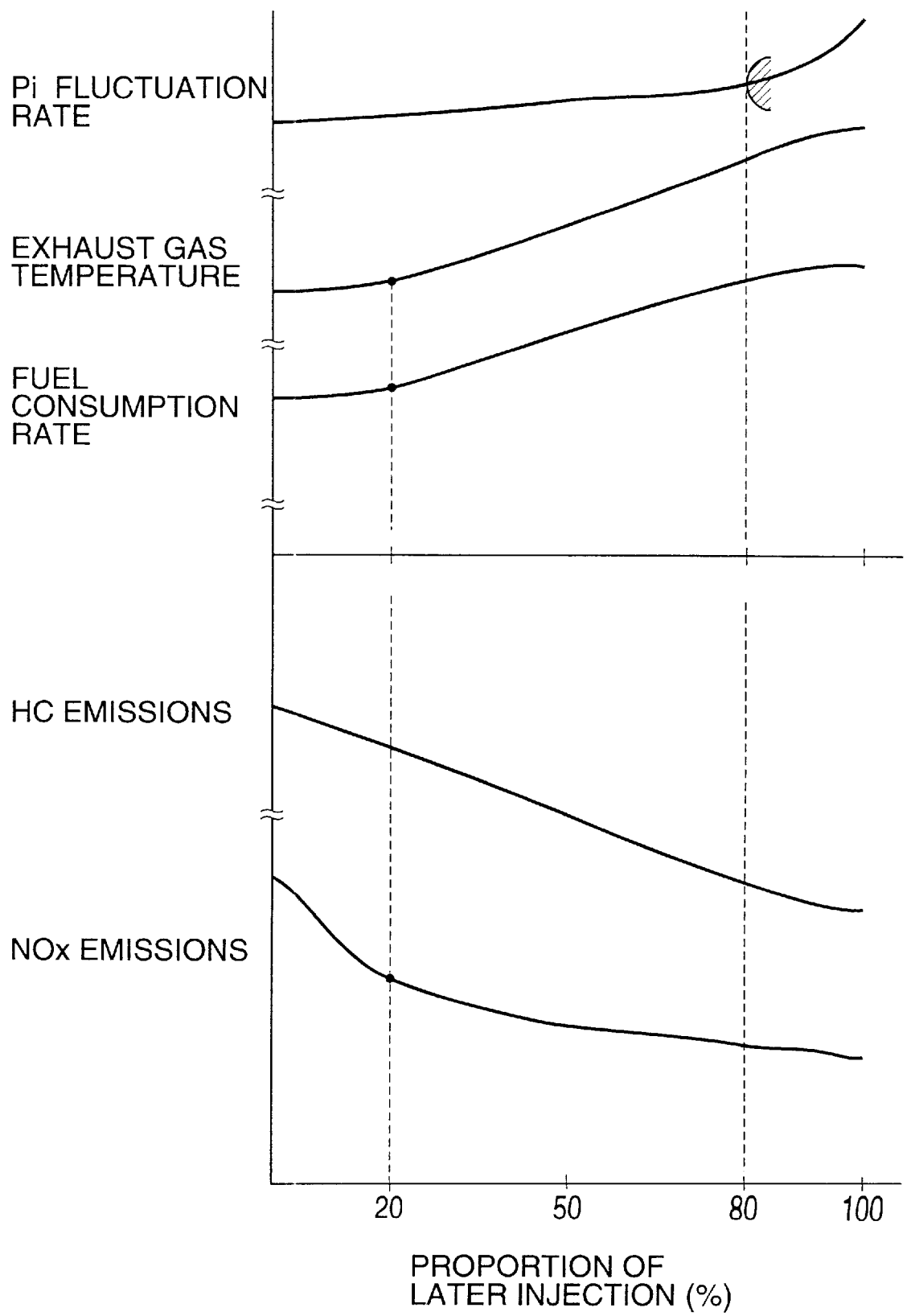
FIG. 13 is a diagram showing variations in Pi fluctuation rate and other parameters observed when the proportion of fuel to be injected by later injection is varied in various ways.
Figure 14:
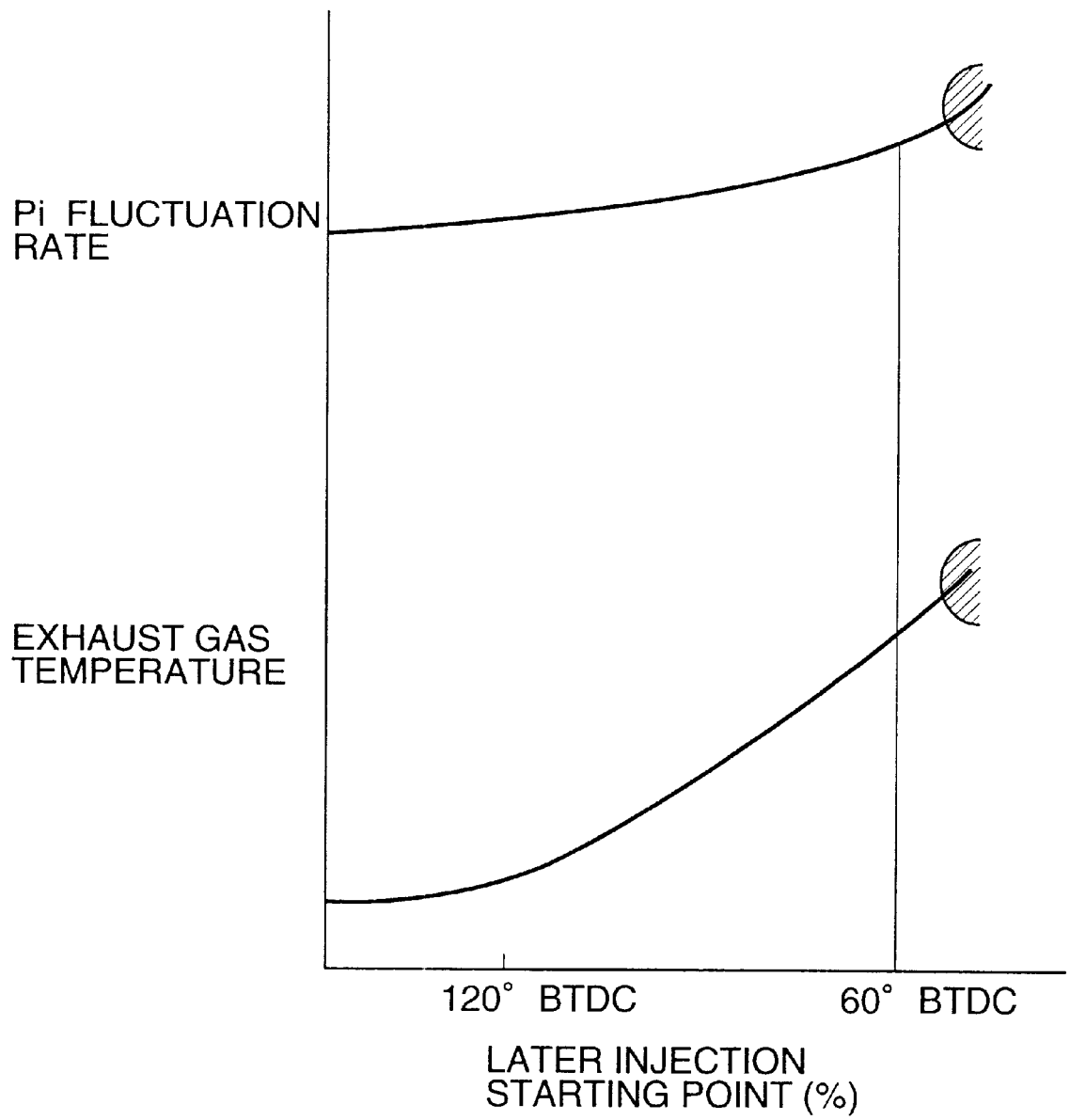
FIG. 14 is a diagram showing variations in Pi fluctuation rate and other parameter observed when later injection start timing is varied in various ways.

Referring to FIGS. 13 and 14, desirable ranges of the proportion of fuel to be injected by the later injection and earlier injection and of the timing of the later injection are explained in the following.

FIG. 13 shows data on the relationship among the proportion of fuel to be injected by the later injection (or the ratio of the amount of fuel injected by the later injection to the amount of fuel injected by the earlier injection) and Pi (indicated mean effective pressure) fluctuation rate, exhaust gas temperature, fuel economy rate, the amount of HC emissions and the amount of NOx emissions. Operating conditions used were an engine speed of 1500 rpm, a brake mean effective pressure (Pe) of 294 kPa and an engine cooling water temperature of 40.0° C., in which the ignition timing was retarded to the top dead center (TDC) on compression stroke. As can be seen from this Figure, exhaust gas temperature increasing effects and HC and NOx reduction effects are not sufficiently obtained if the proportion of fuel injected by the later injection is smaller than 20% (⅕). When the proportion of fuel injected by the later injection becomes equal to or larger than 20% (⅕), the exhaust gas temperature increasing effects and the HC and NOx reduction effects increase with an increase in the proportion of fuel injected by the later injection, but the Pi fluctuation rate and fuel economy rate gradually increase. When the proportion of fuel injected by the later injection exceeds 80%, the Pi fluctuation rate exceeds its permissible level and the combustion stability is lost.

Accordingly, it is desirable to keep the proportion of fuel injected by the later injection within a range of 20% to 80% (⅕ to ⅘) in order to maintain the combustion stability and torque while ensuring the exhaust gas temperature increasing effects and HC and NOx reduction effects. When this is accomplished, the proportion of fuel injected by the earlier injection falls within a range of ⅘ to ⅕. In addition, the exhaust gas temperature increasing effects and HC and NOx reduction effects become greater as the proportion of fuel injected by the later injection is increased, that is, as the proportion of fuel injected by the earlier injection is decreased, as long as these proportions fall within the aforementioned ranges. If the amount of fuel injected by the earlier injection is set to such a low level that the air-fuel ratio within the entire combustion chamber produced by only the earlier injection becomes equal to or higher than the flammability limit air-fuel ratio (approximately 30), the mixture created by the earlier injection becomes sufficiently lean. Since this lean mixture burns slowly, retarding the burning in the latter part of the combustion period, it is possible to obtain sufficient exhaust gas temperature increasing effects and HC and NOx reduction effects.

Further, if the amount of fuel injected by the later injection is made smaller than the amount of fuel injected by the earlier injection (less than 50% in terms of the proportion of fuel injected by the later injection), the combustion stability is increased and fuel consumption is reduced. On the other hand, if the amount of fuel injected by the later injection is made larger than the amount of fuel injected by the earlier injection (greater than 50% in terms of the proportion of fuel injected by the later injection), the exhaust gas temperature increasing effects and HC and NOx reduction effects are enhanced.

In an extreme low-load range, like the idling range, in which the amount of fuel supply to the combustion chamber is small, injection pulselengths corresponding to the divided amounts of injected fuel (or the pulselengths which determine valve-opening periods of the injector) approach a minimum controllable injection pulselength. Accordingly, if the amount of fuel injected by the earlier injection differs from the amount of fuel injected by the later injection, there arises a possibility that the injection pulselength corresponding to the smaller amount of fuel to be injected becomes smaller than the minimum injection pulselength, making it difficult to control the amount of fuel to be injected. In such circumstances, it is desirable to equalize the amount of fuel injected by the later injection and earlier injection (50% of fuel injected by the later injection).

FIG. 14 shows the relationship between later injection start timing and the Pi fluctuation rate and exhaust gas temperature examined under operating conditions of an engine speed of 1500 rpm, a brake mean effective pressure (Pe) of 294 kPa and an engine cooling water temperature of 40.0° C., in which the ignition timing was retarded to the top dead center (TDC) on compression stroke. As can be seen from this Figure, the exhaust gas temperature increasing effects are scarcely obtained when the later injection starting point precedes 120° BTDC. The exhaust gas temperature increasing effects are enhanced when the later injection starting point is retarded to or beyond 120° BTDC. When the Pi fluctuation rate increases and the later injection starting point is retarded beyond 60° BTDC, however, the Pi fluctuation rate exceeds its permissible level and the combustion stability is lost.

If the later injection starting point is set within a range of 120° BTDC to 60° BTDC when the ignition point is retarded to TDC, it is possible to provide appropriate fuel evaporation and atomization times and, as a consequence, the exhaust gas temperature increasing effects are obtained while securing the combustion stability. As it is possible to enhance the exhaust gas temperature increasing effects if the later injection starting point is not retarded up to TDC, the later injection starting point may be set within a range of 120° BTDC to 45° BTDC.

In the extreme low-load range in which the amount of fuel supply to the combustion chamber is small, it is possible to sufficiently retard the injection timing while keeping the later injection starting point in a range not later than 45° BTDC from the viewpoint of fuel evaporation and atomization.

Moreover, if the amount of fuel to be injected by the later injection is relatively small, the later injection starting point may be set within the range of 120° BTDC to 45° BTDC while ensuring that the injection point lies beyond TDC.

According to the construction shown in FIG. 1 and the control operation shown in the time chart of FIG. 3, it is possible to obtain further operational features and effects which are described below.

As the swirl control valve 17 shown in FIG. 1 is closed at least in the low-load range when the catalyst is not heated yet, it produces a swirl within the combustion chamber 5 and thereby enhances turbulence within the combustion chamber 5. As such turbulence enhancing means like the swirl control valve 17 is provided, the combustion stability is increased by enhancement of turbulence within the combustion chamber when the aforementioned split injection is conducted at least in the low-load range while the catalyst is still in its unheated state. It is therefore possible to maintain the combustion stability while suppressing increase in the Pi fluctuation rate even when the later injection starting point is retarded by a relatively large amount to increase the quick light-off effects in split injection, and the catalyst quick light-off operation is promoted even further because the ignition timing retarding limit is increased.

In the control operation shown in the time chart of FIG. 3, the air-fuel ratio is set to a "lean" level during the specified time period ($t_1$ to $t_3$) in which the catalyst temperature is particularly low within the total period when the catalyst is in its unheated state, so that HC and other emissions in the exhaust gases are reduced. Furthermore, there exists excess oxygen when the air-fuel ratio is set to the "lean" level as described above and, and this makes it possible to perform sufficient afterburning of the fuel injected by split injection and is advantageous for quick light-off. From the specified point in time $t_3$ when the catalyst temperature has increased to a certain extent and the catalyst becomes more or less activated, though it is still in its unheated state, the air-fuel ratio is set to the stoichiometric air-fuel ratio ($\lambda=1$). Consequently, HC and NOx are reduced by the conversion effects of the catalyst and its reaction also serves to promote the catalyst quick light-off operation.

The manner of air-fuel ratio control operation is not limited to the foregoing practical example. For example, the air-fuel ratio may be set to a "leaner" level than the stoichiometric air-fuel ratio (but not exceeding 17) during a particular period when the catalyst in its unheated state, or the air-fuel ratio may be controlled such that it matches the stoichiometric air-fuel ratio from a point in time immediately after engine startup.

Also in FIG. 3, split injection for quick light-off is conducted and the ignition timing is retarded when the catalyst is still in its unheated state, and to aid in reducing torque shocks occurring when canceling such control operation and in improving fuel economy, the ignition timing is advanced toward the MBT side when the catalyst temperature has increased and, then, the aforementioned split injection mode is canceled. This process may, however, be altered such that the aforementioned advancement of the ignition timing and cancellation of the split injection mode are made at the same time.

The timing of earlier injection in the split injection mode when the catalyst is in its unheated state is not limited to the intake stroke period but may be at any point during the intake stroke or later as long as that point exists prior to the later injection. As an example, the earlier injection may be made during the earlier portion of the compression stroke.

The invention thus far described by way of specific example provides the following features and advantages.

In one aspect of the invention, a control device for a direct injection engine having a catalyst provided in an exhaust passage for converting exhaust gases and an injector for injecting fuel directly into a combustion chamber comprises a temperature state identifier for judging the temperature state of the catalyst, and a fuel injection controller for controlling fuel injection from the injector, wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst is in its unheated state, in which its temperature is lower than its activation temperature, and either of the later injection cycle and earlier injection cycle injects fuel which contributes to main combustion during a main combustion period in which approximately 10% to 90% by mass of the injected fuel is burnt in a combustion process occurring in the combustion chamber.

According to this aspect of the invention, the injector makes split injection at least in the low-load range of the engine when the catalyst is in its unheated state. The later injection cycle performed in the middle portion of the compression stroke or later produces unevenness in a mixture in which locally rich mixture masses are created. Since relatively rich mixture masses are scattered or locally distributed near a spark plug, ignitability and combustion stability after ignition are ensured, and because a uniform and lean mixture layer is formed by the earlier injection cycle, the combustion slows down in a latter part of the combustion period and continues until a relatively later time. Due to such slow burning in the latter part of the combustion period (which is known as afterburning), HC and NOx in the exhaust gases released from the combustion chamber are reduced, resulting in an improvement in emissions while the catalyst is in its unheated state, and the exhaust gas temperature is increased so that catalyst light-off operation is significantly promoted.

In another aspect of the invention, a control device for a direct injection engine having a catalyst an exhaust passage and an injector for injecting fuel directly into a combustion chamber comprises a temperature state identifier for judging the temperature state of the catalyst which is provided in the exhaust passage for converting exhaust gases, and a fuel injection controller for controlling fuel injection from the injector, wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle regardless of whether the engine has already been heated or not but when the catalyst is in its unheated state, in which its temperature is lower than its activation temperature, and either of the later injection cycle and earlier injection cycle injects fuel which contributes to main combustion.

According to this aspect of the invention, ignitability and combustion stability while the catalyst is in its unheated state are ensured by the split injection regardless of whether the engine has already been heated or not. Further, exhaust gas temperature increasing effects are obtained due to afterburning so that an improvement in emissions while the catalyst is in its unheated state and the promotion of catalyst light-off operation are accomplished.

In the aforementioned form of the invention, the amount of fuel injected in the earlier injection cycle of the split injection performed when the catalyst is in its unheated state is such an amount that produces a lean mixture which has a higher air-fuel ratio than the stoichiometric air-fuel ratio and is capable of flame propagation at least by fuel injected in the later injection cycle and combustion thereof.

The aforementioned air-fuel ratio capable of flame propagation by the fuel injected in the later injection cycle and combustion thereof produced in the combustion chamber by the earlier injection cycle alone should preferably set to 85 or less.

More specifically, it is preferable that the air-fuel ratio in the entire combustion chamber be set to fall within a range of 13 to 17 when the catalyst is in its unheated state, the amount of fuel injected in the earlier injection cycle of the split injection be set to $\frac{1}{5}$ or above of the total amount of the injected fuel, and the air-fuel ratio in the combustion chamber achieved by the earlier injection cycle alone be set to a level equal to or higher than the flammability limit air-fuel ratio. Further, it is preferable set the amount of fuel injected in the later injection cycle of the split injection to $\frac{1}{5}$ or above of the total amount of the injected fuel.

With this arrangement, ignition and subsequent combustion in later injection are made satisfactorily and the fuel injected in the earlier injection cycle is burnt by flame propagation by the fuel injected in the later injection cycle and combustion thereof. As afterburning is made in this manner, it is possible to gain such advantageous effects as a reduction in HC, NOx and other emissions, an increase in exhaust gas temperature, and consequent the quick light-off operation.

A reason why the air-fuel ratio is to be set within the range of 13 to 17 is that a high heat release rate is obtained in this range of air-fuel ratio and it is possible to use an air-fuel ratio capable of increasing the exhaust gas temperature. Furthermore, it is possible prevent an increase in NOx emissions in the exhaust gases released from the combustion chamber and obtain exhaust gas temperature increasing effects by setting the amount of fuel injected in the earlier injection cycle to $\frac{1}{5}$ or above of the total amount of the injected fuel. Moreover, combustion stability is ensured by setting the amount of fuel injected in the later injection cycle to $\frac{1}{5}$ or above of the total amount of the injected fuel (the amount of fuel injected in the earlier injection cycle to $\frac{4}{5}$ or less of the total amount of the injected fuel).

The total amount of the injected fuel referred to above means the total amount of fuel injected during the period from the intake stroke to the ignition point.

In split injection, there is such a relationship between the amount of fuel injected in the earlier injection cycle and the amount of fuel injected in the later injection cycle that the exhaust gas temperature increasing effects are increased if the former is made smaller than the latter.

As an alternative, the amount of fuel injected in the earlier injection cycle of the split injection performed when the catalyst is in its unheated state may be made larger than the amount of fuel injected in the later injection cycle. This alternative approach will serve to increase the combustion stability.

As another alternative, the amount of fuel injected in the earlier injection cycle and the amount of fuel injected in the later injection cycle may be made equal to each other in the split injection performed when the catalyst is in its unheated state. Especially in an extreme low-load range, like the idling range, in which the amount of fuel supply to the combustion chamber is small, the divided amounts of fuel to be injected approach a minimum controllable amount of fuel to be injected (minimum injection pulselength). Accordingly, it is preferable to make these amounts of fuel to be injected equal to each other if there exists a possibility that the smaller amount of fuel to be injected becomes smaller than the minimum controllable amount of fuel to be injected when the amount of fuel injected by the earlier injection differs from the amount of fuel injected by the later injection.

In the aforementioned control device of the invention, it is desirable to begin the later injection cycle before three-fourths of the period of the compression stroke elapses in the split injection performed when the catalyst is in its unheated state. This is because if the later injection starting point is further delayed, torque fluctuation rate increases and the combustion stability is lost.

If there is provided an ignition timing controller which retards the ignition timing by a specified amount beyond the MBT when the aforementioned split injection is performed while the catalyst is in its unheated state, it is possible to achieve the exhaust gas temperature increasing effects by retarding the ignition timing. In particular, retardation of the ignition timing combined with the split injection, which ensures combustibility, produces synergistic effects of the quick light-off operation.

When retarding the ignition timing in the aforementioned manner, it is advantageous if the later injection cycle of the split injection performed when the catalyst is in its unheated state is commenced before the middle portion of the compression stroke elapses. In other words, if the later injection starting point is retarded beyond this point on condition that the ignition timing is retarded, the torque fluctuation rate increases and the combustion stability is lost.

Also, when the catalyst temperature has increased after starting split injection and retardation of the ignition timing when the catalyst is in its unheated state, the split injection mode is canceled and the ignition timing is advanced toward the MBT side in this order, or in reverse order. Torque shocks are reduced by performing the operations for the cancellation of the split injection mode and advancement of the ignition timing toward the MBT side with some time lag in this fashion.

It is however preferable to first perform the operation for advancing the ignition timing toward the MBT side when the catalyst temperature has increased after starting the split injection and retardation of the ignition timing while the catalyst is in its unheated state. This is because if the aforementioned operation for the cancellation of the split injection mode is first performed, a deterioration in combustibility is likely to be caused by the retardation of the ignition timing.

In one approach, after starting split injection and retardation of the ignition timing when the catalyst is in its unheated state, the ignition timing may be advanced toward the MBT side as soon as the split injection mode has been canceled.

Since a deterioration in combustibility can be caused by the retardation of the ignition timing in certain cases when the split injection is stopped, the ignition timing is advanced as soon as the split injection mode has been canceled at the latest.

If the air-fuel ratio within the entire combustion chamber is set approximately to the stoichiometric air-fuel ratio when the catalyst is in its unheated state in the invention, sufficient exhaust gas temperature increasing effects are obtained, and the catalyst begins to exhibits its conversion effects when it is activated to a certain degree even before it reaches a fully heated condition.

Proper control of the air-fuel ratio will be achieved if there are provided an $O_2$ sensor whose output varies at the stoichiometric air-fuel ratio and an injection amount calculator which calculates the amount of fuel to be injected by feedback control such that the air-fuel ratio matches the stoichiometric air-fuel ratio based on the output of the $O_2$ sensor after it has become activated when the catalyst is in its unheated state.

The air-fuel ratio within the entire combustion chamber may be set to a leaner level than the stoichiometric air-fuel ratio within a range not exceeding 17 when the catalyst is in its unheated state. If the air-fuel ratio is set to a more or less leaner level when the catalyst is in its unheated state, it will be advantageous in reducing HC and NOx in the exhaust gases released from the engine.

For this purpose, it is preferable that the control device comprise an $O_2$ sensor whose output varies at the stoichiometric air-fuel ratio, and an injection amount calculator for calculating the amount of fuel to be injected by feedback control based on the output of the $O_2$ sensor after it has become activated when the catalyst is in its unheated state, wherein the injection amount calculator sets the air-fuel ratio at a point offset to the lean side of the stoichiometric air-fuel ratio by adjusting one of such factors as a delay time of change in a control value applicable when the output of the $O_2$ sensor is inverted, a constant of proportionality and an integration constant.

According to this configuration, it is possible to exercise effective feedback control even when producing a lean condition when the catalyst is in its unheated state by using a $\lambda O_2$ sensor (a type of $O_2$ sensor whose output varies at the stoichiometric air-fuel ratio) so that it will be advantageous when performing feedback control at the stoichiometric air-fuel ratio after the catalyst has been heated.

In a case where the air-fuel ratio within the entire combustion chamber is controlled to a leaner level than the stoichiometric air-fuel ratio when the catalyst is in its unheated state as described above, it will be advantageous to vary the air-fuel ratio to the "richer" side in accordance with subsequent increase in catalyst temperature. More specifically, if the air-fuel ratio is varied from the lean condition to the "richer" side, or to match the stoichiometric air-fuel ratio, for example, when the catalyst temperature has increased to such a level that the catalyst begins to be activated, it will be advantageous for using the conversion effects of the catalyst and the quick light-off effects will be further increased.

In a further aspect of the invention, a control device for a direct injection engine having a catalyst provided in an exhaust passage for converting exhaust gases and an injector for injecting fuel directly into a combustion chamber comprises a temperature state identifier for judging the temperature state of the catalyst, and a fuel injection controller for controlling fuel injection from the injector, wherein the fuel injection controller controls the injector based on judgment results of the temperature state identifier in such a way that the injector makes two-step split injection including an earlier injection cycle performed during the period of an intake stroke and a later injection cycle commenced in a middle portion of a compression stroke or later but not later than 45° before top dead center thereof when the catalyst is in its unheated state, in which its temperature is lower than its activation temperature, and wherein the fuel injection controller sets the air-fuel ratio in the entire combustion chamber to fall within a range of 13 to 17 and the amount of fuel injected in the earlier injection cycle to fall within a range of about ⅕ to about ⅘ of the total amount of the injected fuel.

Since the total amount of the injected fuel is so adjusted that the air-fuel ratio in the entire combustion chamber falls within the range of 13 to 17 when the catalyst is in its unheated state in this aspect of the invention, it is possible to use the air-fuel ratio which provides a high heat release rate suited for increasing the exhaust gas temperature. Also, since the proportion of the fuel injected in the earlier injection cycle is set to about ⅕ or above, an increase of NOx in the exhaust gases released from the combustion chamber is avoided and exhaust gas temperature increasing effects are achieved. In addition, combustion stability is ensured since the proportion of the fuel injected in the earlier injection cycle is controlled to about ⅘ or less. As about ⅕ to ⅘ of the total amount of fuel input is injected in the earlier injection cycle during the intake stroke and the remainder of the total fuel input is injected in the middle portion of the compression stroke or later as described above, ignition and subsequent combustion are made satisfactorily and slow burning is made in the latter part of the combustion period. As a result, HC, NOx and other emissions are reduced, and the exhaust gas temperature is increased so that effects of promoting catalyst quick light-off operation is sufficiently exhibited.

In the above-described control device of the invention, the later injection cycle of the split injection performed when the catalyst is in its unheated state should preferably be commenced in a period not later than 45° before top dead center of the compression stroke. It is preferable that the later injection cycle of the split injection be commenced in a period from 120° before top dead center of the compression stroke to 45° before top dead center thereof. Combustion stability is jeopardized if the later injection starting point occurs later than the aforementioned periods, whereas unevenness in mixture concentration is not sufficiently produced if the later injection starting point occurs earlier than the aforementioned periods.

Preferably, the amount of fuel injected in the earlier injection cycle of the split injection performed when the catalyst is in its unheated state should be such an amount that produces a lean mixture which has a higher air-fuel ratio than the stoichiometric air-fuel ratio and is capable of flame propagation at least by fuel injected in the later injection cycle and combustion thereof, and the lean air-fuel ratio higher than the stoichiometric air-fuel ratio capable of flame propagation by the fuel injected in the later injection cycle and combustion thereof produced in the combustion chamber by the earlier injection cycle alone should be set to 85 or less.

In an extreme low-load range, like the idling range, in which the amount of fuel supply to the combustion chamber is small, the divided amounts of fuel to be injected approach a minimum controllable amount of fuel to be injected (minimum injection pulselength). Accordingly, it is preferable to make these amounts of fuel to be injected equal to each other if there exists a possibility that the smaller amount of fuel to be injected becomes smaller than the minimum controllable amount of fuel to be injected when the amount of fuel injected by the earlier injection differs from the amount of fuel injected by the later injection.

When the catalyst has reached its heated state and its temperature has become equal to or higher than its activation temperature, mode of fuel injection from the injector may be switched to intake stroke injection or to compression stroke injection as is commonly done in control operation of this type of engines.

Effects of quick light-off are enhanced if the control device of this invention further comprises an ignition timing controller for retarding an ignition point by a specified amount from a minimum spark advance for best torque (MBT) when the split injection is performed while the catalyst is in its unheated state. In this case, it is preferable to retard the ignition point by a specified amount from the MBT when the catalyst is in its unheated state and then advance the ignition point toward the MBT according to an increase in catalyst temperature.

According to the invention, the air-fuel ratio in the entire combustion chamber may be set to a level equal to or higher than the stoichiometric air-fuel ratio when the catalyst is in its unheated state. This makes it possible to obtain an air-fuel ratio advantageous in reducing HC and NOx in the exhaust gases released from the engine and the catalyst quick light-off operation.

Proper control of the air-fuel ratio advantageous in reducing HC and NOx and the catalyst quick light-off operation will be achieved if there are provided an $O_2$ sensor whose output varies at the stoichiometric air-fuel ratio and an injection amount calculator which calculates the amount of fuel to be injected by feedback control such that the air-fuel ratio matches the stoichiometric air-fuel ratio based on the output of the $O_2$ sensor after it has become activated when the catalyst is in its unheated state.

The aforementioned control device may further comprise an $O_2$ sensor whose output varies at the stoichiometric air-fuel ratio and an injection amount calculator for calculating the amount of fuel to be injected by feedback control based on the output of the $O_2$ sensor after it has become activated when the catalyst is in its unheated state, wherein the injection amount calculator sets the air-fuel ratio at a point offset to the lean side of the stoichiometric air-fuel ratio by adjusting one of such factors as a delay time of change in a control value applicable when the output of the $O_2$ sensor is inverted, a constant of proportionality and an integration constant.

The control device may be such that the air-fuel ratio in the entire combustion chamber is set to a level higher than the stoichiometric air-fuel ratio when the catalyst is in its unheated state and then the air-fuel ratio is varied to the rich side with an increase in catalyst temperature.

The control device may further comprise a turbulence enhancer for enhancing turbulence within the combustion chamber when the catalyst is in its unheated state. In this construction, combustibility is increased by the enhanced turbulence and the ignition timing retarding limit is increased when the split injection is performed, so that the catalyst light-off operation is even more promoted.

Furthermore, there may be provided an engine speed controller for controlling the engine such that its idling speed becomes higher when the catalyst is in its unheated state than after the catalyst has been heated. As the engine speed is increased while the split injection is performed, combustibility is increased and the ignition timing retarding limit is increased, so that the catalyst light-off operation is even more promoted.

In a still further aspect of the invention, a control device for a direct injection engine having a catalyst provided in an exhaust passage for converting exhaust gases and an injector for injecting fuel directly into a combustion chamber comprises a temperature state identifier for judging the temperature state of the catalyst, a load condition detector for sensing engine load conditions, and a fuel injection controller for controlling fuel injection from the injector, wherein the fuel injection controller controls the injector based on judgment results of the temperature state identifier and on sensing results of the load condition detector in such a way that the injector injects fuel in a compression stroke to have the engine perform stratified charge combustion in its low-load range and injects fuel in an intake stroke to have the engine perform uniform combustion in its high-load range when the catalyst is in its heated state, in which its temperature is equal to or higher than its activation temperature, and the injector makes two-step split injection including an earlier injection cycle performed during the period of the intake stroke and a later injection cycle commenced in a middle portion of the compression stroke or later but not later than 45° before top dead center thereof at least in a low-load range of the engine when the catalyst is in its unheated state, in which its temperature is lower than its activation temperature, and wherein the fuel injection controller sets the air-fuel ratio in the entire combustion chamber to fall within a range of 13 to 17 and the amount of fuel injected In the earlier injection cycle to fall within a range of about ⅕ to about ⅘ of the total amount of the injected fuel in the split injection.

According to this aspect of the invention, effects of quick light-off and HC and NOx reduction are obtained when the catalyst is in its unheated state, and stratified charge combustion and uniform combustion, for example, are performed according to opera ting conditions after the catalyst has reached in its heated state.

In a yet further aspect of the invention, a control device for a direct injection engine having a catalyst provided in an exhaust passage for converting exhaust gases and an injector for injecting fuel directly into a combustion chamber comprises a temperature state identifier for judging the temperature state of the catalyst, and a fuel injection controller for controlling fuel injection from the injector, wherein the fuel injection controller controls the injector based on judgment results of the temperature state identifier in such a way that the injector injects fuel in an intake stroke to have the engine perform uniform combustion when the catalyst is in its heated state, in which its temperature is equal to or higher than its activation temperature, and the injector makes two-step split injection including an earlier injection cycle performed during the period of the intake stroke and a later injection cycle commenced in a middle portion of the compression stroke or later but not later than 45° before top dead center thereof at least in a low-load range of the engine when the catalyst is in its unheated state, in which its temperature is lower than its activation temperature, and wherein the fuel injection controller sets the air-fuel ratio in the entire combustion chamber to fall within a range of 13 to 17 and the amount of fuel injected in the earlier injection cycle to fall within a range of about ⅕ to about ⅘ of the total amount of the injected fuel in the split injection.

According to this aspect of the invention, effects of quick light-off and HC and NOx reduction are obtained when the catalyst is in its unheated state, and uniform combustion is performed after the catalyst has reached in its heated state.

It is preferable that the aforementioned control device of the invention further comprise an ignition timing controller for retarding an ignition point by a specified amount from the MBT.

Furthermore, it is preferable that the air-fuel ratio in the entire combustion chamber be set to a level equal to or higher than the stoichiometric air-fuel ratio when the catalyst is in its unheated state.

Moreover, it is preferable that the aforementioned control device of the invention further comprise an $O_2$ sensor whose output varies at the stoichiometric air-fuel ratio, and an injection amount calculator for calculating the amount of fuel to be injected by feedback control such that the air-fuel ratio matches the stoichiometric air-fuel ratio, based on the output of the $O_2$ sensor after it has become activated when the catalyst is in its unheated state.

INDUSTRIAL APPLICABILITY

As will be understood from the foregoing discussion, the present invention serves to reduce HC and NOx in exhaust gases released from a combustion chamber when a catalyst is still in its unheated state, resulting in an improvement in emissions, and significantly promote catalyst quick light-off operation as a result of an increase in exhaust gas temperature. The invention is particularly suited for application to a direct injection engine mounted on a motor vehicle, for example.

What is claimed is:

1. A control device for a direct injection engine having a catalyst provided in an exhaust passage for converting exhaust gases and an injector for injecting fuel directly into a combustion chamber, the control device comprising:
    a temperature state identifier for judging the temperature state of the catalyst; and
    a fuel injection controller for controlling fuel injection from the injector;
    wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst is in its unheated state, in which its temperature is lower than its activation temperature, and the later injection cycle and earlier injection cycle inject fuel which contribute to a main combustion during a main combustion period in which approximately 10% to 90% by mass of the injected fuel is burned from start to end of combustion occurring in the combustion chamber.

2. A control device for a direct injection engine according to claim 1, wherein the fuel injection controller controls the injector in such a way that the injector makes the split injection regardless of whether the engine has already been heated or not but when the catalyst is in its unheated state.

3. A control device for a direct injection engine having a catalyst provided in an exhaust passage for converting exhaust gases and an injector for injecting fuel directly into a combustion chamber, the control device comprising:
    a temperature state identifier for judging the temperature state of the catalyst; and
    a fuel injection controller for controlling fuel injection from the injector; wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst is in its unheated state, in which its temperature is lower than its activation temperature, and the later injection cycle and earlier injection cycle inject fuel which contribute to a main combustion during a main combustion period in which approximately 10% to 90% by mass of the injected fuel is burned from start to end of combustion occurring in the combustion chamber,
    wherein the fuel injection controller controls the injector in such a way that the injector makes two-step split injection including an earlier injection cycle performed during the period of an intake stroke and a later injection cycle commenced in a middle portion of a compression stroke or later but not later than 45° before top dead center thereof when the catalyst is in its unheated state, in which its temperature is lower than its activation temperature; and sets the air-fuel ratio in the entire combustion chamber to fall within a range of 13 to 17 and the amount of fuel injected in the earlier injection cycle to fall within a range of about ⅕ to about ⅘ of the total amount of the injected fuel.

4. A control device for a direct injection engine according to claim 3, wherein the amount of fuel injected in the earlier injection cycle of the split injection performed when the catalyst is in its unheated state is such an amount that produces a lean mixture which has a higher air-fuel ratio than the stoichiometric air-fuel ratio and is ensures flame propagation at least by fuel injected in the later injection cycle and combustion thereof, and the lean air-fuel ratio higher than the stoichiometric air-fuel ratio capable of flame propagation by the fuel injected in the later injection cycle and combustion thereof produced in the combustion chamber by the earlier injection cycle alone is set to 85 or less.

5. A control device for a direct injection engine according to claim 3, wherein the amounts of fuel injected in the earlier injection cycle and the later injection cycle of the split injection performed when the catalyst is in its unheated state are made equal to each other.

6. A control device for a direct injection engine according to claim 3, wherein mode of fuel injection from the injector is switched to intake stroke injection or to compression stroke injection when the catalyst has reached its heated state and its temperature has become equal to or higher than its activation temperature.

7. A control device for a direct injection engine according to claim 3, further comprising an ignition timing controller for retarding an ignition point by a specified amount from a minimum spark advance for best torque (MBT) when the split injection is performed while the catalyst is in its unheated state.

8. A control device for a direct injection engine according to claim 7, wherein the ignition point is retarded by a specified amount from the MBT when the catalyst is in its unheated state and then the ignition point is advanced toward the MBT according to an increase in catalyst temperature.

9. A control device for a direct injection engine according to claim 3, wherein the air-fuel ratio in the entire combustion chamber is set to a level equal to or higher than the stoichiometric air-fuel ratio when the catalyst is in its unheated state.

10. A control device for a direct injection engine according to claim 9, further comprising:

an $O_2$ sensor whose output varies at the stoichiometric air-fuel ratio; and an injection amount calculator for calculating the amount of fuel to be injected by feedback control such that the air-fuel ratio substantially matches the stoichiometric air-fuel ratio based on the output of the $O_2$ sensor after it has become activated when the catalyst is in its unheated state.

11. A control device for a direct injection engine according to claim 9, further comprising:

an $O_2$ sensor whose output varies at the stoichiometric air-fuel ratio; and an injection amount calculator for calculating the amount of fuel to be injected by feedback control based on the output of the $O_2$ sensor after it has become activated when the catalyst is in its unheated state;

wherein the injection amount calculator sets the air-fuel ratio at a point offset to the lean side of the stoichiometric air-fuel ratio by adjusting one of such factors as a delay time of change in a control value applicable when the output of the $O_2$ sensor is inverted, a constant of proportionality and an integration constant.

12. A control device for a direct injection engine according to claim 9 or 11, wherein the air-fuel ratio in the entire combustion chamber is set to a level higher than the stoichiometric air-fuel ratio when the catalyst is in its unheated state and then the air-fuel ratio is varied to the rich side with an increase in catalyst temperature.

13. A control device for a direct injection engine according to one of claims 1 to 3, further comprising a turbulence enhancer for enhancing turbulence within the combustion chamber when the catalyst is in its unheated state.

14. A control device for a direct injection engine according to one of claims 1 to 3, further comprising an engine speed controller for controlling the engine such that its idling speed becomes higher when the catalyst is in its unheated state than after the catalyst has been heated.

15. A control device for a direct injection engine having a catalyst provided in an exhaust passage for converting exhaust gases and an injector for injecting fuel directly into a combustion chamber, the control device comprising:

a temperature state identifier for judging the temperature state of the catalyst; and a fuel injection controller for controlling fuel injection from the injector; wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst is in its unheated state, in which its temperature is lower than its activation temperature, and the later injection cycle and earlier injection cycle inject fuel which contribute to a main combustion during a main combustion period in which approximately 10% to 90% by mass of the injected fuel is burned from start to end of combustion occurring in the combustion chamber, and a load condition detector for sensing engine load conditions, wherein the fuel injection controller controls the injector based on judgment results of the temperature state identifier and on sensing results of the load condition detector in such a way that the injected injects fuel in a compression stroke to have the engine perform stratified charge combustion in its low-load range and injects fuel in an intake stroke to have the engine perform uniform combustion in its high-load range when the catalyst is in its heated state, in which its temperature is equal to or higher than its activation temperature, and the injector makes two-step split injection including an earlier injection cycle performed during the period of the intake stroke and a later injection cycle commenced in a middle portion of the compression stroke or later but not later than 45° before top dead center thereof at last in an low-load range of the engine when the catalyst is in its unheated state, in which its temperature is lower than its activation temperature; and sets the air-fuel ratio in the entire combustion chamber to fall within a range of 13 to 17 and the amount of fuel injected in the earlier injection cycle to fall within a range of about 1/5 to 4/5 of the total amount of the injected fuel in the split injection.

16. A control device for a direct injection engine having a catalyst provided in an exhaust passage for converting exhaust gases and an injector for injecting fuel directly into a combustion chamber, the control device comprising:

a temperature state identifier for judging the temperature state of the catalyst; and a fuel injection controller for controlling fuel injection from the injector; wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst is in its unheated state, in which its temperature is lower than its activation temperature, and the later injection cycle and earlier injection cycle inject fuel which contribute to a main combustion during a main combustion period in which approximately 10% to 90% by mass of the injected fuel is burned from start to end of combustion occurring in the combustion chamber, wherein the fuel injection controller controls the injector based on judgment results of the temperature state identifier in such a way that the injector injects fuel in an intake stroke to have engine perform uniform combustion when the catalyst is in its heated state, in which its temperature is equal to or higher than its activation temperature, and the injector makes two-step split injection including an earlier injection cycle performed during the period of the intake stroke and a later injection cycle commenced in a middle portion of the compression stroke or later but not later than 45° before top dead center thereof at least in a low-load range of the engine when the catalyst is in its unheated state, in which its temperature is lower than its activation temperature; and sets the air-fuel ratio in the entire combustion chamber to fall within a range of 13 to 17 and the amount of fuel injected in the earlier injection cycle to fall within a range of about ⅕ to about ⅘ of the total amount of the injected fuel in the split injection.

17. A control device for a direct injection engine according to claim 15 or 16, further comprising an ignition timing controller for retarding an ignition point by a specified amount from a minimum spark advance for best torque (MBT).

18. A control device for a direct injection engine according to claim 15 or 16, wherein the air-fuel ratio in the entire combustion chamber is set to a level equal to or higher than the stoichiometric air-fuel ratio when the catalyst is in its unheated state.

19. A control device for a direct injection engine according to claim 18, further comprising:

an $O_2$ sensor whose output varies at the stoichiometric air-fuel ratio; and an injection amount calculator for calculating the amount of fuel to be injected by feedback control such that the air-fuel ratio matches the stoichiometric air-fuel ratio, based on the output of the $O_2$ sensor after it has become activated when the catalyst is in its unheated state.

20. A control device for a direct injection engine having a catalyst provided in an exhaust passage for converting exhaust gases and an injector for injecting fuel directly into a combustion chamber, the control device comprising:

a temperature state identifier for judging the temperature state of the catalyst; and a fuel injection controller for controlling fuel injection from the injector;

wherein the fuel injection controller controls the injector based on judgment results of the temperature state identifier in such a way that the injector makes at least two-step split injection during a period from an intake stroke to an ignition point including a later injection cycle performed in a middle portion of a compression stroke or later and an earlier injection cycle performed prior to the later injection cycle at least in a low-load range of the engine when the catalyst is in its unheated state, in which its temperature is lower than its activation temperature, and the later injection cycle and the earlier injection cycle inject fuel which contributes to maintain combustion during a main combustion period in which approximately 10% to 90% by mass of the injected fuel is burned from state to end of a combustion occurring in the combustion chamber; and sets the air-fuel ratio in the entire combustion chamber to fall within a range of 13 to 17, and such an amount of fuel injected in the earlier injection cycle of the split injection performed when the catalyst is in its unheated state that produces a lean mixture having an air-fuel ratio in the combustion chamber obtained by the earlier injection cycle alone which is higher than a flammability limit air fuel ratio and is 85 or less, and ensures flame propagation at least by fuel injected in the later injection cycle and combustion thereof.

21. A control device for a direct injection engine according to claim 20, wherein the amount of fuel injected in the earlier injection cycle is equal or lower than that of fuel injected in the later injection cycle.

22. A control device for a direct injection engine according to claim 20, wherein the air-fuel ratio in the entire combustion chamber is set to a level higher than the stoichiometric air-fuel ratio but not higher than 17 when the catalyst is in its unheated state.

23. A control device for a direct injection engine according to claim 20, wherein the air-fuel ratio in the entire combustion chamber is set to a level equal to or higher than the stoichiometric air-fuel ratio when the catalyst is in its unheated state.

24. A control device for a direct injection engine according to claim 23, further comprising;

an $O_2$ sensor whose output varies at the stoichiometric air-fuel ratio; and an injection amount calculator for calculating the amount of fuel to be injected by feedback control wherein the air-fuel ratio in the entire combustion chamber is set to a level higher than the stoichiometric air-fuel ratio when the catalyst is in its unheated state; and the injection amount calculator calculates the amount of fuel such that the air-fuel ratio matches the stoichiometric air-fuel ratio based on the output of the $O_2$ sensor after it has become activated when the catalyst is in its unheated state.

25. A control device for a direct injection engine according to claim 23, further comprising:

an $O_2$ sensor whose output varies at the stoichiometric air-fuel ratio; and an injection amount calculator for calculating the amount of fuel to be injected by feedback control based on the output of the $O_2$ sensor after it has become activated when the catalyst is in its unheated state;

wherein the injection amount calculator sets the air-fuel ratio at a point offset to the lean side of the stoichiometric air-fuel ratio by adjusting one of such factors as a delay time of change in a control value applicable when the output of the $O_2$ sensor is inverted, a constant of proportionality and an integration constant.

26. A control device for a direct injection engine according to claim 23, wherein the air-fuel ratio in the entire combustion chamber is set to a level higher than the stoichiometric air-fuel ratio when the catalyst is in its unheated state and then the air-fuel ratio is varied to the rich side with an increase in catalyst temperature.

27. A control device for a direct injection engine according to claim 20, wherein mode of fuel injection from the injector is switched to intake stroke injection or to compression stroke injection when the catalyst has reached its heated state and its temperature has become equal to or higher than its activation temperature.

28. A control device for a direct injection engine according to claim 20, further comprising an ignition timing controller for retarding an ignition point by a specified amount from a minimum spark advance for best torque (MBT) when the split injection is performed while the catalyst is in its unheated state.

29. A control device for a direct injection engine according to claim 28, wherein the ignition point is retarded by a specified amount from the MBT when the catalyst is in its unheated state and the ignition point is advanced toward the MBT according to an increase in catalyst temperature.

30. A control device for a direct injection engine according to claim 20, further comprising a turbulence enhancer for enhancing turbulence within the combustion chamber when the catalyst is in its unheated state.

31. A control device for a direct injection engine according to claim 20, further comprising an engine speed controller for controlling the engine such that its idling speed becomes higher when the catalyst is in its unheated state than after the catalyst has been heated.

* * * * *